United States Patent Office 3,398,139
Patented Aug. 20, 1968

3,398,139
PROCESS FOR PREPARING 2-AMINO-
BENZODIAZEPINES
George Francis Field, Nutley, and Leo Henryk Sternbach, Upper Montclair, N.J., assignors to Hoffmann-La Roche Inc., Nutley, N.J., a corporation of New Jersey
No Drawing. Continuation-in-part of applications Ser. No. 358,919, Apr. 10, 1964, and Ser. No. 400,193, Sept. 29, 1964. This application Dec. 3, 1964, Ser. No. 415,793
7 Claims. (Cl. 260—239)

This application is a continuation-in-part of applications 358,919, filed Apr. 10, 1964, and 400,193, filed Sept. 29, 1964, both now abandoned.

This invention relates to compounds and conversions in the field of organic chemistry. More particularly, it relates to valuable processes for producing chemical intermediates, to novel chemical compounds useful as intermediates, to novel chemical compounds which are pharmaceutically useful, to methods for making them and also to methods for preparing known pharmaceutically useful compounds from said novel chemical intermediates.

5 - phenyl - 1,3 - dihydro - 2H - 1,4-benzodiazepin-2-one 4-oxides are a valuable class of organic compounds. One method of preparing these compounds consists of reacting a 2-aminobenzophenone β-oxime with a haloacetyl halide such as chloroacetyl chloride and subjecting the so-formed 2-haloacetamido benzophenone oxime intermediate to treatment with alkali whereby there is formed the desired 5-phenyl-1,3-dihydro-2H-1,4-benzodiazepin-2-one 4-oxide. 2-aminobenzophenone oximes are capable of two steric configurations. The α-stereo isomers are oximes in which the hydroxyl group is in the syn-position to the amino group, whereas in the β-isomers, the hydroxyl group is in the anti-position to the amino group. Only the β-oximes undergo the reaction sequence above outlined, which leads to 5 - phenyl - 1,3 - dihydro - 2H-1,4-benzodiazepin-2-one 4-oxides. Unfortunately, these β-oximes of 2-aminobenzophenones are less stable and more difficultly accessible than the corresponding α-oximes. One purpose of this invention is to provide a process for converting α-oximes of aminobenzophenones to the corresponding β-configuration. It has been found that, in the presence of a heavy metal salt, α-oximes of the formula

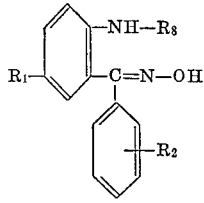

I wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_8$ is hydrogen, lower alkyl, cyclo-lower alkyl or cyclo-lower alkyl-lower alkyl can be reacted with ketones or aldehydes of the formula

II wherein $R_3$ and $R_4$ are each independently selected from the group consisting of hydrogen, lower alkyl, halo- lower alkyl, amino lower alkyl, aza-cyclo-lower alkyl-lower alkyl, and together, lower alkylene, aza-lower alkylene and N-lower alkyl-aza-lower alkylene to form 1,2-dihydro-quinazoline 3-oxides of the formula

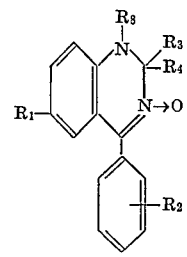

III wherein $R_1$, $R_2$, $R_3$, $R_4$ and $R_8$ have the same meaning as above and the so-formed 1,2-dihydro-quinazoline 3-oxides can then be cleaved to yield β-oximes of Formula I above.

In one embodiment of the invention the intermediate 1,2-dihydro-quinazoline 3-oxide of Formula III wherein $R_8$ is hydrogen can be lower alkylated to form compounds of the formula

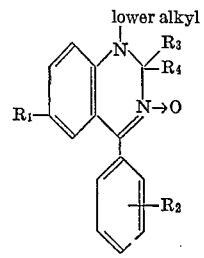

III-a wherein $R_1$, $R_2$, $R_3$ and $R_4$ have the same meaning as above.

Compounds of Formula III-a a can then be cleaved to yield β-oximes of the formula

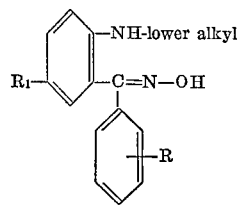

I-a wherein $R_1$ and $R_2$ have the same meaning as above.

As used herein, lower alkyl comprehends both straight and branched chain saturated hydrocarbon groups having from 1 to 7 carbon atoms, such as methyl, ethyl, isopropyl and the like. The terms halo, halogen, halide, etc. comprehend all four halogens, i.e., bromine, chlorine, fluorine and iodine. The term halo-lower alkyl comprehends lower alkyl groups in which one or more of the hydrogen atoms have been replaced by halogen atoms. Where more than one halogen atom is present, they can be the same or different halogens. When the moiety $R_1$, $R_3$ or $R_4$ comprehends halogen or a halogen-containing group, then bromine or chlorine is preferred. When the moiety $R_2$ comprehends a halogen atom, then chlorine or fluorine is preferred. When the moiety $R_3$ or $R_4$ comprehends a halo-lower alkyl, then the α-monohalo lower alkyls and the α,α-dihalo-lower alkyls such as α-mono-chloromethyl, α,α-dichloromethyl and the like are preferred. The term amino lower alkyl comprehends unsubstituted as well as mono- and di-substituted amino alkyl groups, preferably mono-lower alkyl and di-lower alky-amino alkyl groups. The term aza-cyclo-lower-alkyl-lower alkyl comprehends saturated nitrogen containing heterocyclic rings preferably containing 5 or 6 ring atoms, such as piperidino or the like, bonded to the 2-position carbon atom of the quinazoline ring via a lower alkyl moiety. When $R_3$ and $R_4$ are taken together and have the meaning lower alkylene, there is comprehended a straight or branched chain hydrocarbon group, forming together with the 2-position carbon atom in Formula III, a cycloalkyl moiety, for example, cyclohexyl, or with the carbonyl radical in Formula II a cycloalkyl ketone, such as cyclohexanone. Similarly, when $R_3$ and $R_4$, taken together, are aza-lower alkylene, there is comprehended a moiety which, taken together with the 2-position carbon atom in Formula III, is a saturated nitrogen-containing heterocyclic ring, such as piperidine, or with the carbonyl radical in Formula II a piperidone, e.g., a 4-piperidone such as 1-methyl-4-piperidone. When $R_3$ and $R_4$ together are N-lower alkyl-aza-lower alkylenes, then said saturated nitrogen-containing heterocyclic ring contains a lower alkyl substituent on its aza-nitrogen atom; for example, as in N,3-di(lower alkyl) - piperidine or N-lower alkyl-piperidine.

Thus, a preferred group of compounds of Formula III wherein $R_3$ and $R_4$ together are selected from the group consisting of aza-lower alkylene and N-lower alkyl-aza-lower alkylene are compounds of the formula

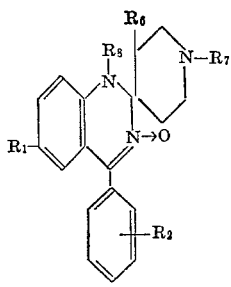

IV wherein $R_1$, $R_2$ and $R_8$ have the same meaning as above and $R_6$ and $R_7$ are each independently selected from the group consisting of hydrogen and lower alkyl.

Thus, compounds of Formula III wherein $R_4$ and $R_3$ together are aza-lower alkylene would be comprehended by Formula IV above wherein $R_7$ is hydrogen. When $R_6$ is hydrogen, the lower alkylene moiety would be straight chain whereas when $R_6$ is lower alkyl, the lower alkylene moiety would, of course, be branched chain. Compounds of Formula III wherein $R_4$ and $R_3$ are together N-lower alkyl-aza-lower alkylene would be represented by Formula IV above when $R_7$ is lower alkyl.

Still another preferred group of compounds of Formula III wherein one of the substituents on the 2-position carbon atom of the quinazoline ring is an aza-cyclo-lower alkyl-lower alkyl group are compounds of the formula

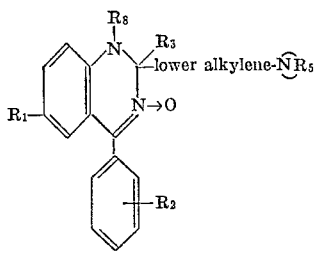

V wherein $R_1$ and $R_2$ have the same meaning as above; $R_3$ and $R_8$ are each independently selected from the group consisting of hydrogen and lower alkyl; and $R_5$ is lower alkylene.

Compounds of Formula V above, as well as pharmaceutically acceptable acid addition salts thereof, are useful as hypotensive agents.

The process of this invention whereby an oxime of Formula I is condensed with a ketone or aldehyde of Formula II to form a 1,2-dihydro-quinazoline 3-oxide of Formula III can be conducted utilizing the ketone or aldehyde of Formula II as the reaction medium. However, it can also be conducted in an inert organic solvent, preferably one in which the oxime is substantially soluble, for example, a lower alkanol such as methanol, ethanol or the like, ether, dioxane, tetrahydrofuran, diglyme, a hydrocarbon such as benzene, toluene, or the like. The reaction can be conducted at room temperature, elevated temperatures, or below room temperature. When reacting an $\alpha$-oxime of Formula I, a heavy metal salt is suitably added to the reaction medium. The anionic part of the heavy metal salt is not critical and can be derived either from an organic or inorganic acid, preferably the latter. It has been found especially suitable to utilize a cupric salt, for example, cupric sulfate, i.e., to conduct the reaction in the presence of a cupric salt, e.g., cupric sulfate. The amount of cupric sulfate used does not appear to be critical, but it has been found that cupric salts such as cupric sulfate exert a favorable influence on the reaction of the $\alpha$-oxime of Formula I with a ketone or aldehyde of Formula II. Accordingly, the reaction of an $\alpha$-oxime of Formula I with a ketone or aldehyde of Formula II in the presence of a cupric salt, such as cupric sulfate is a preferred embodiment of this invention. The reaction of a compound of Formula II with a $\beta$-oxime of Formula I is suitably conducted in the presence of a heavy metal salt, as described above for $\alpha$-oxime, or in the presence of a basic or acidic catalyst. The quantity of catalyst present is not critical. Moreover, the catalyst can be either inorganic or organic, for example, a suitable basic catalyst is pyridine or the like and suitable acidic catalysts are hydrohalic acids such as hydrochloric acid, hydrobromic acid, acetic acid or the like.

The formation of a compound of Formula III–a from a compound of Formula III is suitably conducted by alkylating means conventional per se. For example, a compound of Formula III can be alkylated by reaction with a lower alkyl halide (preferably a bromide or iodide) in the presence of a strong base such as potassium or sodium lower alkoxide or hydride. Di-lower alkylsulfates can also be used to effect said alkylation.

In another aspect of this invention, 1,2-dihydro-quinazoline 3-oxides of Formula III or III–a can be cleaved by acid hydrolysis to yield $\beta$-oximes of Formula I. The acid hydrolysis is suitably conducted in the presence of water at room temperature, below room temperature or at an elevated temperature (but the temperature should not be so high as to destroy the desired $\beta$-oxime). The hydrolysis can, if desired, be carried out in an organic solvent such as, for example, a lower alkanol, for example, methanol, ethanol or the like, dioxane, tetrahydrofuran, dimethyl sulfoxide or the like, organic solvents which themselves are not subject to acid hydrolysis.

In another embodiment of the invention, the cleavage is conducted in the presence of a ketone or aldehyde of Formula II whereby the moiety represented by the symbols $R_3$ and $R_4$ taken together with the 2-position carbon atom in Formula III can be replaced by a different moiety, for example, by subjecting a compound of Formula III or III–a wherein $R_3$ and $R_4$ are each methyl, to acid hydrolysis in the presence of chloroacetone, there can be obtained a compound of Formula III or III–a wherein one of $R_3$ and $R_4$ is methyl and the other is chloromethyl.

Preferred ketones of Formula II which can be used in the reaction with oximes of Formula I are, for example, acetone, chloroacetone, dichloroacetone, 1-methyl-4-piperidone, 1,3-dimethyl-4-piperidone, piperidinoacetone and cyclohexanone. Especially preferred ketones for the conversion into β-oximes are di-lower alkyl ketones, such as acetone and methyl ethyl ketone and cyclo-lower alkanones, such as cyclohexanone. Preferred aldehydes of Formula II which can be used in said reaction are acetaldehyde, chloroacetaldehyde and dichloroacetaldehyde.

In another aspect of the present invention, compounds of Formulae III and III–a can be subjected to treatment with phosphorus trichloride or hydrogen in the presence of a catalyst such as Raney nickel whereby there are formed compounds of the formula

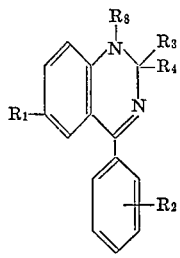

VI wherein $R_1$, $R_2$, $R_3$, $R_4$ and $R_8$ have the same meaning as above.

In still another aspect compounds of Formula VI can be reduced to yield compounds of the formula

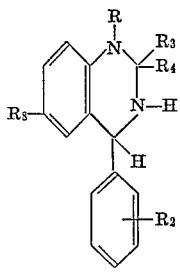

VII wherein $R_1$, $R_2$, $R_3$, $R_4$ and $R_8$ have the same meaning as above.

Compounds of Formula VI and of Formula VII and their acid addition salts are useful as anticonvulsants and as anoretic agents.

The compounds of Formulae V, VI and VII which, as set forth above, are pharmaceutically useful compounds, can be administered internally, for example, orally or parenterally, with dosage adjusted to individual requirements. For purposes of administration they can be placed in conventional solid or liquid pharmaceutical administration forms and can be combined with conventional pharmaceutical solid or liquid carriers. For example, said compounds of Formulae V–VII or their pharmaceutically acceptable acid addition salts can be administered in conventional pharmaceutical administration forms, such as dispersions, capsules, emulsions, suspensions, tablets or the like, and can be combined with conventional pharmaceutical carriers or excipients such as corn starch, lactose or the like.

The compounds of Formulae V, VI and VII form acid addition salts. For example, they form pharmaceutically acceptable acid addition salts with pharmaceutically acceptable organic or inorganic acids such as acetic acid, succinic acid, methanesulfonic acid, para-toluenesulfonic acid, maleic acid, hydrochloric acid, hydrobromic acid, phosphoric acid, sulfuric acid or the like. Acid addition salts of compounds of Formulae V–VII which are not pharmaceutically acceptable can be converted into either the free base or into pharmaceutically acceptable acid addition salts by conventional techniques, for example, by neutralization and then, if desired, by reaction with a pharmaceutically acceptable acid.

Compounds of Formulae III–VI are, as explained above, useful as chemical intermediates. Compounds of Formulae III to V can be converted by acid cleavage to 2-aminobenzophenone β-oximes or by acid cleavage in the presence of an aldehyde or ketone of Formula II, into other compounds of Formulae III–V, some of which, as more specifically set forth above, are pharmaceutically useful. For these purposes, the compounds of Formulae III–V can be utilized either in the form of the free base or in the form of an acid addition salt and, of course, acid addition salts used for this purpose need not be pharmaceutically acceptable.

In still another embodiment of this invention the compounds of Formula III above wherein $R_3$ and $R_8$ are both hydrogen and $R_4$ is an α,α-dihalo lower alkyl group can be subjected to a variety of reactions leading to known pharmaceutically valuable compounds. They can, for example, be ring enlarged to form known benzodiazepines or they can be dehydrohalogenated to form the corresponding quinazoline compounds. These process steps can be illustrated graphically by the following diagrammatic flow sheet.

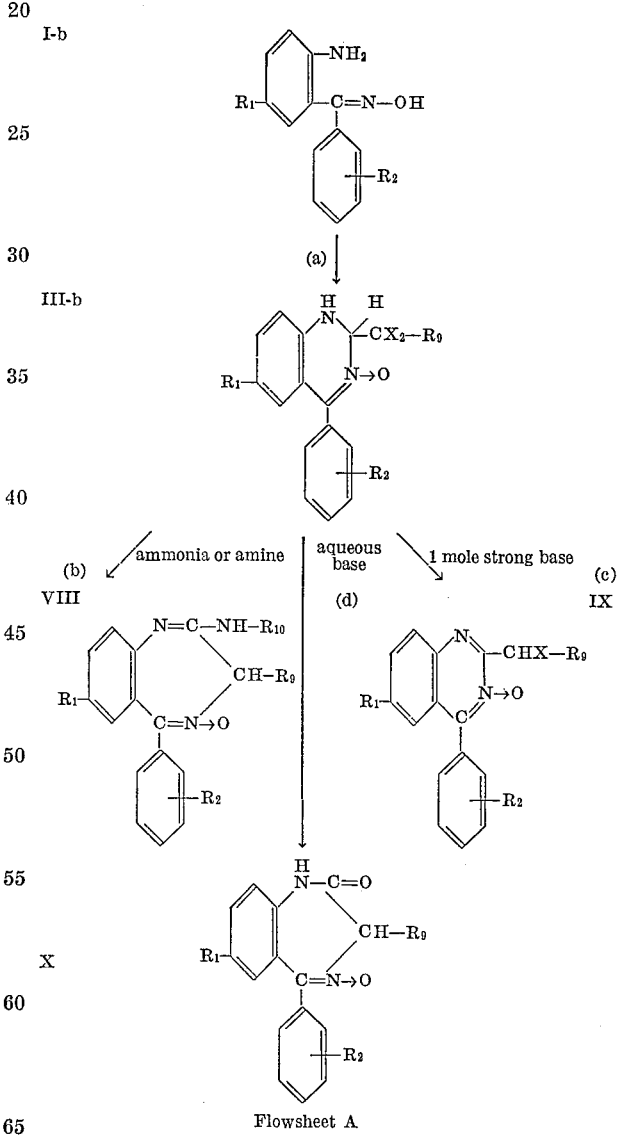

Flowsheet A

The symbols $R_1$ and $R_2$ in the formulas above have the same meaning as ascribed to like symbols hereinbefore. The symbol $R_9$ represents hydrogen or alkyl of 1 to 6 C atoms; X represents halogen; and $R_{10}$ represents hydrogen, lower alkyl or lower alkenyl.

Thus, in one particular process embodiment of the present invention, there can be prepared known benzodiazepines represented by the Formula VIII in the diagram above.

As part of this invention there is therefore provided a process for preparing compounds of Formula VIII which comprises, in a first step, preparing 1,2-dihydroquinazoline compounds of Formula III-*b* and, in a next step, treating the dihydroquinazoline compound with ammonia or a primary amine, i.e., lower alkyl amine or lower alkenyl amine, to form the desired Formula VIII compound. This process is represented graphically by steps (a) and (b) in the above diagram. The preparation of the dihydroquinazoline compounds of Formula III-*b* as represented in step (a) above can be effected by any of the previously described methods.

The second step of this process, i.e., step (b) in the diagram, can be carried out by using one of the reactants, i.e., liquid ammonia or liquid amine as solvent. In such case, the reaction is conducted by simply mixing the reactants. The reaction begins immediately upon mixing the reactants and is ordinarily completed in about 3 to 4 hours. Alternatively, the reaction can be carried out in an inert organic solvent such as lower alkyl alcohols, e.g., methanol, ethanol, propanol and the like, ethers, dioxane, tetrahydrofuran, hydrocarbons, e.g., benzene, toluene, etc. When a solvent is used, the reaction can be carried out by first forming a suspension of the quinazoline compounds in the solvent and treating it with gaseous ammonia or an amine. The suspension of the quinazoline compound is formed by simply stirring a mixture of the quinazoline compound and the solvent. Alternatively, ammonia or an appropriate amine can be dissolved in a suitable solvent and the quinazoline compound added to said solution. The reactants can be used in any molar ratio but it has been found preferable to use at least about 3 moles of the ammonia or amine per mole of the quinazoline compound. The reaction of the quinazoline compound with ammonia or amine can be carried out at the boiling temperature of ammonia or the amine, at room temperature or above or below room temperature. A preferred temperature range is between about $-7°$ C. and about $80°$ C. A particularly preferred embodiment of the above-described process comprises the preparation of the known pharmaceutically valuable compound, 7-chloro-2-methylamino-5-phenyl-3H-1,4-benzodiazepine 4-oxide.

In another particular process embodiment of this invention the dihydroquinazolines of Formula III-*b* can be converted to the corresponding quinazoline compounds of Formula IX by treatment with a strong base, more especially a non-nucleophilic strong base such as, for example, an alkali metal tertiary alcoholate, preferably a lower alkyl alcoholate such as sodium or potassium t-butoxide or sodium or potassium t-amylate, etc.; an alkali metal hydride, e.g., sodium hydride, etc.; an alkali metal triphenyl methide, e.g., sodium triphenyl methide, etc.; or an alkali metal secondary amide, e.g., sodium diethyl amide, etc. The compounds of Formula IX are known compounds useful as intermediates in the preparation of pharmaceutically valuable compounds. This particular process aspect of the invention is represented graphically by steps (a) and (c) in the above diagram. The reaction leading to the formation of compounds of Formula IX, i.e., step (c) in the diagram is preferably carried out with about one mole of the non-nucleophilic strong base per mole of the dihydroquinazoline compound, though, if desired, the quinazoline compound can be used in excess. The reaction can be carried out in any inert organic solvent, such as, for example, ethers, dioxane, tetrahydrofuran, hydrocarbons such as benzene, toluene and the like. The reaction can be carried out at room temperature or above or below room temperature. It is preferred, however, to carry out the reaction at a temperature between about $-30°$ and $+30°$ C. Compounds of Formula IX are base labile and can be converted to compounds of Formula X below by employing a large molar excess of strong base.

In still another particular process embodiment of this invention the dihydroquinazolines of Formula III-*b* can be treated with base whereby the quinazoline compound undergoes ring expansion to form the corresponding benzodiazepin-2-one 4-oxides of Formula X. This particular process aspect of the invention is represented by steps (a) and (d) in the above diagram. The ring expansion of compounds of Formula III-*b* to benzodiazepin-2-one 4-oxides is preferably effected with an aqueous solution of a strong base such as an alkali metal hydroxide as, for example, sodium or potassium hydroxide. The reaction is preferably carried out in an inert organic solvent such as an alcohol, for example, ethanol or methanol. The reaction can be conducted at room temperature or above or below room temperature though it is preferred to use an elevated temperature. A suitable temperature is between about room temperature and the boiling point of the reaction mixture.

In still another specific embodiment of the invention there is provided a method for preparing known compounds of the formula

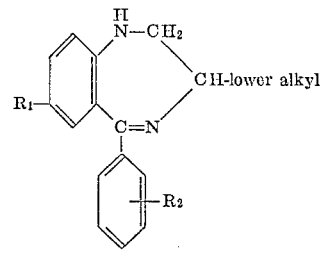

XI wherein $R_1$ and $R_2$ have the same significance as hereinbefore.

Compounds of Formula XI above can be prepared by several routes. One convenient route of preparation consists of treating a 1,2-dihydroquinazoline 3-oxide of Formula III wherein $R_3$ is lower alkyl and $R_4$ is monohalomethyl with a strong base such as, for example, an alkali metal tertiary alcoholate, e.g., lower alkyl alcoholates such as sodium or potassium t-butoxide and sodium or potassium t-amylate; an alkali metal hydride, e.g., sodium hydride, etc.; an alkali metal triphenyl methide, e.g., sodium triphenyl methide, etc.; or an alkali metal secondary amide, e.g., sodium diethyl amide, etc., thereby forming a compound of the formula

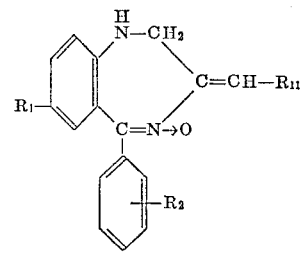

XI-a wherein $R_1$ and $R_2$ have the same significance as hereinbefore and $R_{11}$ is hydrogen or alkyl of 1 to 6 C atoms.

The reaction is suitably carried out in an inert organic solvent such as ether, tetrahydrofuran, dioxane and the like. In carrying out the above reaction it is preferred to use more than one mole of strong base per mole of the quinazoline 3-oxide compound.

Compounds of Formula XI-*a* are converted to compounds of Formula XI by known method of reduction as, for example, by catalytic hydrogenation with Raney nickel.

Alternatively, the compounds of Formula XI can be prepared by treating a 1,2-dihydroquinazoline of Formula VI wherein $R_3$ is lower alkyl and $R_4$ is monohalomethyl with a strong base thereby forming a compound of the formula

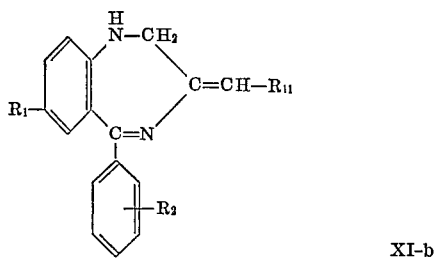

XI-b wherein $R_1$ and $R_2$ have the same significance as hereinabove and $R_{11}$ is hydrogen or alkyl of 1–6 C atoms.

Compounds of Formula XI-b can then be reduced in a manner similar to the reduction of the Formula XI-a compounds thereby forming the desired Formula XI compound.

Compounds of Formulae XI-a and XI-b are characterized by the presence of an exocyclic double bond. They are novel compounds which together with their pharmaceutically acceptable salts are useful as anti-convulsants and, thus, they constitute a part of this invention. The preparation of compounds of Formulae XI-a and XI-b and their use as chemical intermediates in the preparation of compounds of Formula XI can be traced with respect to the following diagram.

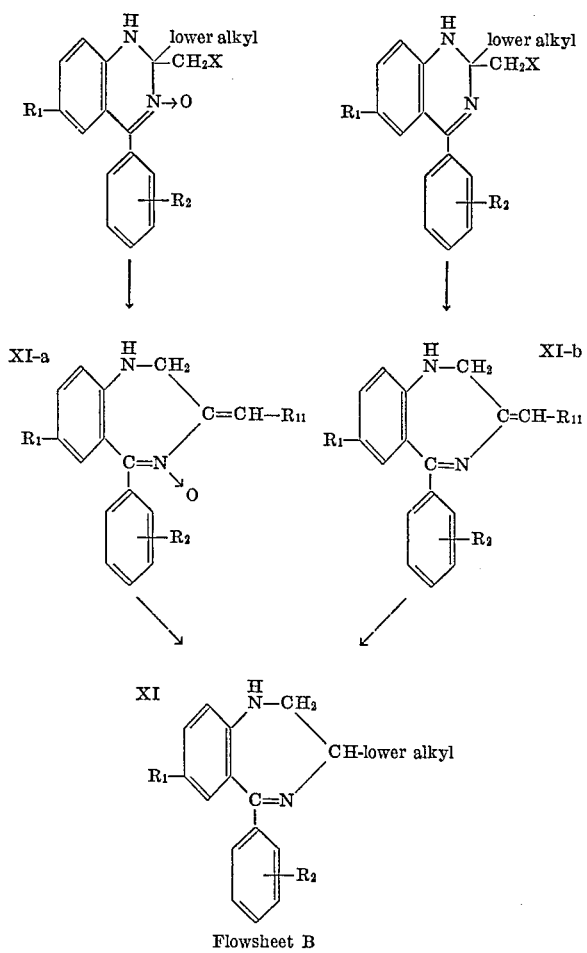

Flowsheet B

In yet another specific process embodiment of the invention the 1,2-dihydroquinazoline 3-oxides of Formula III, wherein $R_3$ and $R_8$ are both hydrogen and $R_4$ is lower alkyl or halo-lower alkyl, can be oxidized to form the corresponding quinazolines. The dihydroquinazoline 3-oxides of Formula III answering to the above description can be represented by the formula

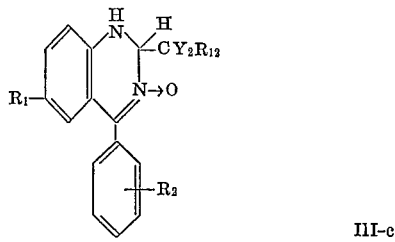

III-c wherein $R_1$ and $R_2$ have the same meaning as ascribed to like symbols hereinbefore; $R_{12}$ is hydrogen, halogen or alkyl of 1 to 6 C atoms; and Y is hydrogen or halogen.

Compounds of Formula III-c can, as stated above, be oxidized to compounds of the formula

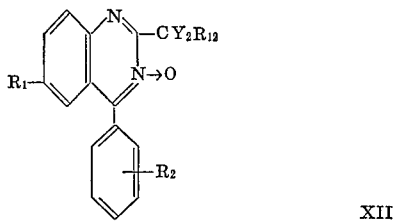

XII wherein $R_1$, $R_2$, $R_{12}$ and Y have the same significance as hereinbefore by treating with an oxidizing agent such as, for example, sodium dichromate, iodine, manganese dioxide, potassium permanganate and the like with sodium dichromate being the preferred oxidant. The reaction is preferably carried out in an acidic solution. One can use either an organic or an inorganic acid. Suitable acids are, for example, the mineral acids such as sulfuric, phosphoric, etc. or the organic acids such as acetic acid, etc. The reaction can be conveniently carried out by simply mixing the reactants and allowing the reaction to proceed at room temperature. The quinazoline compounds prepared by oxidation with the dihydroquinazolines of Formula III-c can be further reacted to form known pharmaceutically valuable compounds. Thus, for example, the compounds of Formula XII wherein one of the Y substituents is hydrogen and the other is halogen can be reacted with ammonia or alkylamine to give known benzodiazepines such as 7 - chloro-2-methylamino-5-phenyl-3H-1,4-benzodiazepine 4-oxide. Alternatively, there can be prepared known benzodiazepin-2-ones such as, for example, 3-hydroxy-7-chloro - 5-phenyl-3H-1,4-benzodiazepin-2(1H)-one by sequentially treating a compound of Formula XII wherein both Y substituents are halogen with alkali, phosphorous trichloride and an alkali metal salt of a lower alkanoic acid and thereafter hydrolyzing the product so-obtained. The methods of preparing the known benzodiazepines of Formulas XIII and XIV from quinazolines of Formula XII do not constitute a part of this invention but are presented here in order that the disclosure may be complete. The method of preparing these known benzodiazepines from the dihydroquinazoline compounds of Formula III-c can be traced with respect to the following schematic diagram.

I-b

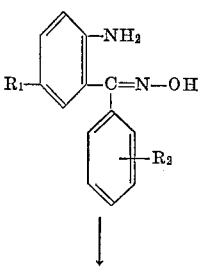

III-c

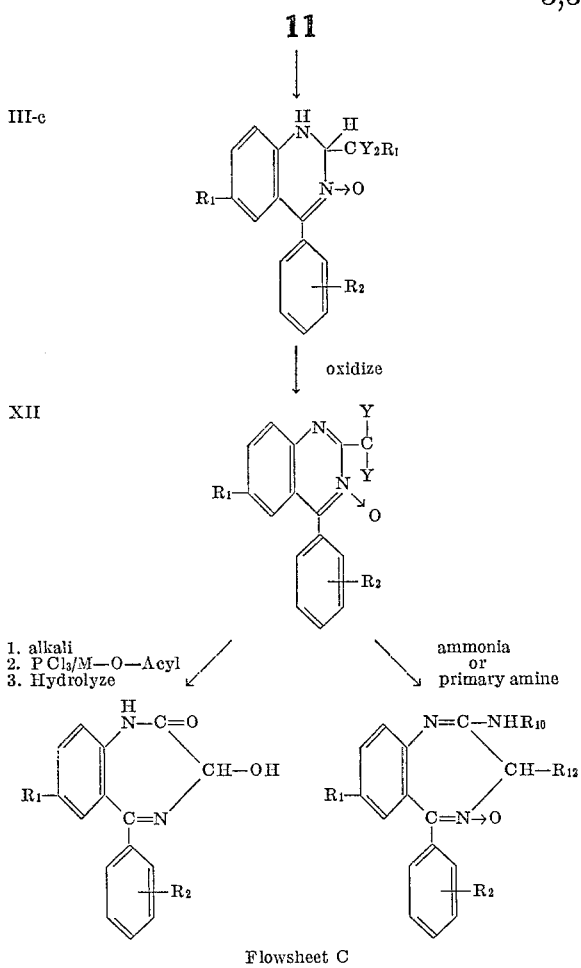

Flowsheet C

In the above formulas the symbols $R_1$, $R_2$, $R_{10}$, $R_{12}$ and Y have the same meaning as like symbols hereinabove.

The conversion of the quinazoline compounds of Formula XII to the desired benzodiazepine compounds of Formula XIII is accomplished by reacting the quinazoline compound of Formula XII wherein one Y substituent is halogen and the other is hydrogen with ammonia or with a primary amine utilizing known techniques whereby rearrangement occurs giving the desired benzodiazepine compound.

Alternatively, the quinazoline compound of Formula XII can be converted to known benzodiazepin-2-ones of Formula XIV. Such conversion is effected by initially treating a compound of Formula XII wherein both Y substituents are halogen with a suitable inorganic base such as an alkali metal hydroxide, e.g., sodium hydroxide. By this treatment, the quinazoline ring is converted into a 1,4-benzodiazepin-2-one 4-oxide which is then treated with phosphorous trichloride and an alkali metal salt of a lower alkanoic acid of the formula M—O-Acyl                  XIV-a wherein M is an alkali metal and the Acyl moiety is a lower alkanoyl group.

Preferably, M in the above formula is sodium and the lower alkanoyl group is acetyl. The compound so-obtained can be hydrolyzed by any convenient hydrolyzing technique known in the art such as treatment with a base in a solvent, for example, a methanolic solution of sodium hydroxide, thereby forming the desired benzodiazepin-2-one of Formula XIV.

In yet another specific embodiment of the invention, the 1,2 - dihydroquinazoline 3 - oxides of Formula III wherein $R_8$ is hydrogen, $R_3$ is lower alkyl and $R_4$ is α-monohaloalkyl can be treated with aqueous sodium hydroxide in a solvent such as ethanol whereby the quinazoline compound undergoes ring expansion to form a benzodiazepine 4-oxide of the formula

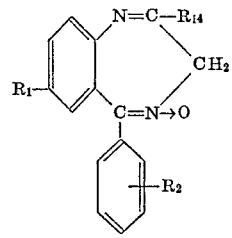

XV wherein $R_1$ and $R_2$ have the same significance as hereinbefore and $R_{14}$ represents a lower alkyl group.

Compounds of Formula XV above can be converted to a variety of benzodiazepine compounds. They can be hydrogenated by methods readily apparent to those skilled in the art, for example, with Raney nickel to form the corresponding 1,2-dihydrobenzodiazepines of the formula

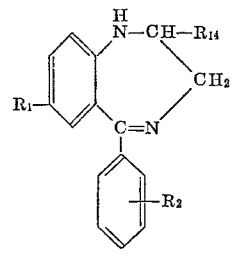

XV-a wherein $R_1$ and $R_2$ have the same significance as like symbols hereinbefore and $R_{14}$ is lower alkyl.

They can be reduced by known techniques such as with sodium boro-hydride to form 1,2-dihydrobenzodiazepine 4-oxides or with lithium aluminum hydride to form tetrahydrobenzodiazepin - 4 - ols. The 1,2-dihydrobenzodiazepine 4-oxides obtained by sodium borohydride reduction can be treated with phosphorous trichloride or hydrogenated Raney nickel to form the corresponding 1,2-dihydrobenzodiazepines of Formula XV-a above. The 1,2-dihydrobenzodiazepines of Formula XV-a can in turn be oxidized with manganese dioxide to form the corresponding benzodiazepines of the formula

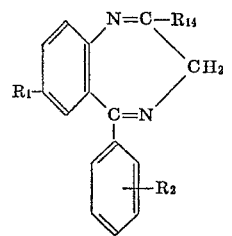

XV-b wherein $R_1$, $R_2$ and $R_{14}$ have the same significance as above.

The reduction and oxidation steps described above can be carried out by standard techniques known to the art.

The compounds of Formula XV above can also be acylated, for example, with lower alkanoic anhydrides, e.g., acetic anhydride or lower alkanoyl halides such as acetyl chloride, leading to compounds of the formula

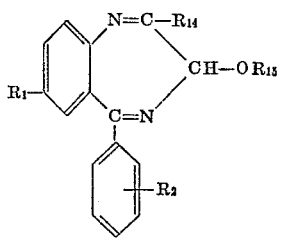

XVI wherein $R_1$, $R_2$ and $R_{14}$ have the same significance as hereinbefore and $R_{15}$ is hydrogen or lower alkanoyl.

Compounds of Formula XVI above wherein $R_{15}$ is hydrogen, i.e., compounds of the formula

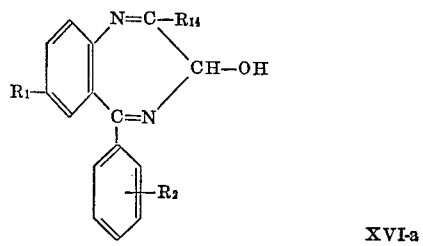

XVI-a wherein $R_1$, $R_2$, and $R_{14}$ have the same significance as above are prepared by hydrolysis of the corresponding acyloxy compound. Hydrolysis is effected by treating a compound of Formula XVI wherein $R_{15}$ is lower alkanoyl, e.g., acetyl, with a suitable base such as an alkali metal hydroxide, for example, sodium or potassium hydroxide. The hydrolysis is suitably carried out in an inert organic solvent such as tetrahydrofuran, dioxane and the like.

Alternatively, compounds of Formula XVI wherein $R_{15}$ is lower alkanoyl are converted to compounds of the formula

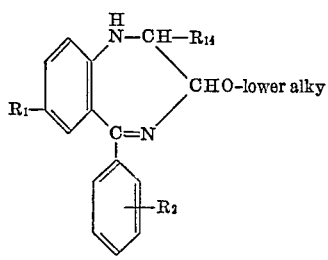

XVI-b wherein $R_1$, $R_2$ and $R_{14}$ have the same significance as hereinabove by treating the corresponding acyloxy compound with sodium borohydride in alcohol whereby the 1,2-double bond is reduced and the acetoxy group is replaced with a lower alkoxy group. The reduction with sodium borohydride is preferably carried out using a lower alkyl alcohol as solvent. The reaction is suitably carried out at about room temperature or above or below room temperature though it is preferred to carry out the reaction between about room temperature and about 0° C.

Certain of the process steps described above are illustrated graphically in the following diagrammatical flow sheet.

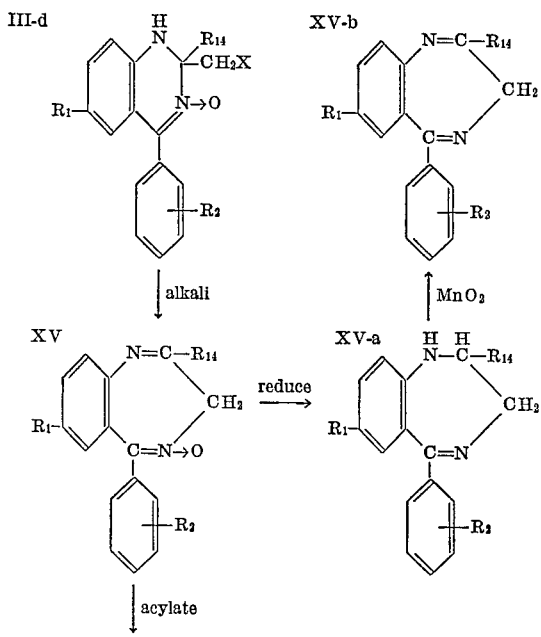

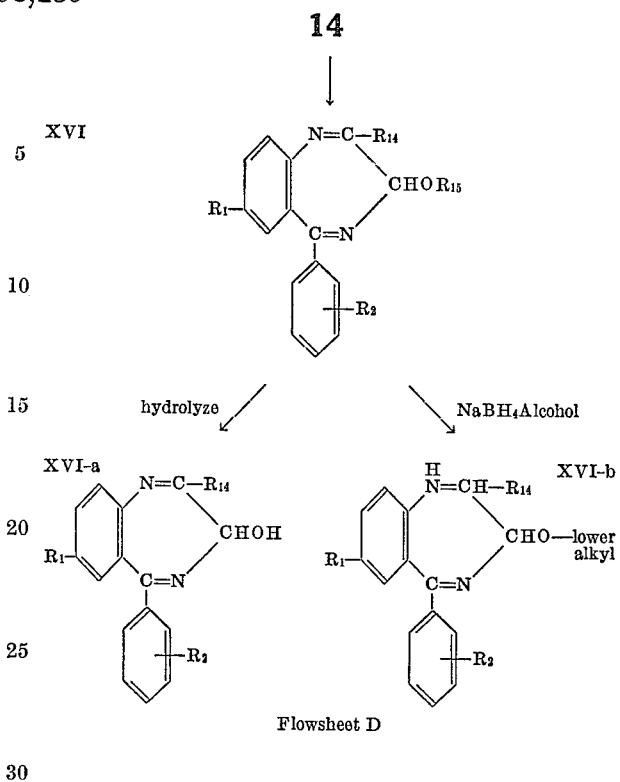

Flowsheet D

The symbols $R_1$, $R_2$, $R_{14}$, $R_{15}$ and X in the above formulas have the same meaning as ascribed to like symbols hereinabove.

The novel end products of this particular aspect of the invention, i.e., the compounds of Formulae XV-b, XVI, XVI-a and XVI-b and their pharmaceutically acceptable salts are useful as anticonvulsants. Compounds of Formulae XV and XV-a as explained above are useful as chemical intermediates.

The compounds of Formulae XI-a, XI-b, XV-b, XVI, XVI-a and XVI-b which, as set forth above, are pharmaceutically useful compounds can be administered internally, for example, orally or parenterally, with dosage adjusted to individual requirements. For purposes of administration, they can be placed in conventional solid or liquid pharmaceutical administration forms and can be combined with conventional pharmaceutical solid or liquid carriers. For example, said compounds of Formulae XI-a, XI-b, XV-b, XVI, XVI-a and XVI-b or their pharmaceutically acceptable acid addition salts can be administered in conventional pharmaceutical administration forms, such as dispersions, capsules, emulsions, suspensions, tablets or the like, and can be combined with conventional pharmaceutical carrier or excipients, such as corn starch, lactose or the like.

The compounds of Formulae XI-a, XI-b, XV, XV-a, XV-b, XVI, XVI-a and XVI-b form acid addition salts. For example, they form pharmaceutically acceptable acid addition salts with pharmaceutically acceptable organic or inorganic acids such as acetic acid, succinic acid, methanesulfonic acid, para-toluenesulfonic acid, maleic acid, hydrochloric acid, hydrobromic acid, phosphoric acid, sulfuric acid or the like. Acid addition salts of compounds of Formulae X and XV through XVI-b which are not pharmaceutically acceptable can be converted into either the free base or into pharmaceutically acceptable acid addition salts by conventional techniques, for example, by neutralization and then, if desired, by reaction with a pharmaceutically acceptable acid.

In still another embodiment of the present invention, the compounds of Formula III wherein $R_8$ is hydrogen, $R_3$ is α-monohalo lower alkyl and $R_4$ is hydrogen, lower alkyl or α-monohalo lower alkyl, can be converted to tricyclic compounds of the formula

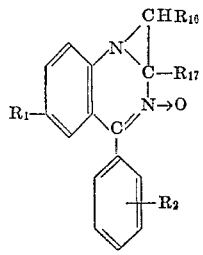

XVIII wherein $R_1$ and $R_2$ have the same significance as hereinbefore $R_{16}$ is hydrogen or alkyl of 1 to 6 C atoms; and $R_{17}$ is hydrogen, lower alkyl or halo lower alkyl. The compounds of Formula XVIII are novel and are useful as intermediates in the preparation of known pharmaceutically valuable benzodiazepines. The compounds of Formula XVIII above are prepared by treating an appropriate dihydroquinazoline compound of Formula III with a strong base, for example, an alkali metal tertiary alcoholate, e.g., sodium or potassium t-butoxide or sodium or potassium t-amylate, etc.; an alkali metal hydride, e.g., sodium hydride, etc.; an alkali metal triphenyl methide, e.g., sodium triphenyl methide, etc.; an alkali metal secondary amide, e.g., sodium diethyl amide, etc. The reaction is preferably carried out under anhydrous conditions. The reaction can be conducted at room temperature or above or below room temperature but is preferably effected at about room temperature. The reaction can be conveniently conducted in an inert organic solvent such as tetrahydrofuran, benzene, dioxane, diethyl ether or the like.

Compounds of Formula XVIII above, when heated in an inert organic solvent undergo isomerization to form compounds of the formula

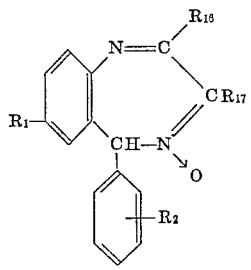

XVIII-a wherein $R_1$, $R_2$, $R_{16}$ and $R_{17}$ have the same significance as above.

Compounds of Formula XVIII-a are prepared from compounds of Formula XVIII by heating the latter compound to a temperature in the range of about 40° to about 150°. The isomerization reaction is preferably carried out in a solvent such as benzene, toluene, dioxane, tetrahydrofuran and the like. Alternatively, the compounds of Formula XVIII-a can be obtained directly from compounds of Formula III by treating a compound of Formula III with a strong base, preferably a non-nucleophilic strong base as above, at an elevated temperature, i.e., a temperature in the range of about 40° to about 80°. Compounds of Formula XVIII above are treated with a reducing agent such as sodium borohydride to give tetrahydro-1,4-benzodiazepin-4-ols of the formula

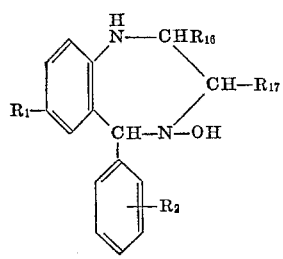

XIX wherein $R_1$, $R_2$, $R_{16}$ and $R_{17}$ have the same significance as above.

The hydroxylamines of Formula XIX can also be obtained from the isomeric compounds of Formula XVIII-a by reduction with lithium aluminum hydride.

Oxidation of the compounds of Formula XIX leads to 2,3-dihydro derivatives of the formulas

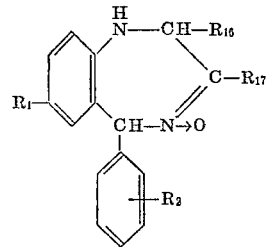

XX

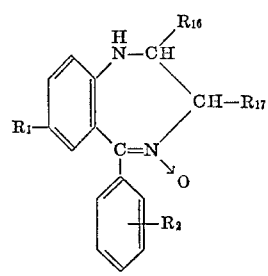

XXI wherein $R_1$, $R_2$, $R_{16}$ and $R_{17}$ have the same significance as above.

In oxidizing compounds of Formula XIX to compounds of Formulas XX and XXI, it is preferred to employ mercuric oxide as oxidizing agent. The reaction is preferably carried out in an organic solvent or in a mixture of solvents such as acetone-water. The reaction is suitably carried out at room temperature though temperatures above or below room temperature could also be used.

The 4-oxide compounds of Formula XX above can be deoxygenated to form compounds of the formula

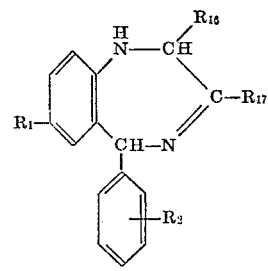

XX-a wherein $R_1$, $R_2$, $R_{16}$ and $R_{17}$ have the same significance as hereinabove, by treating with phosphorous trichloride. The above-described deoxygenation of the 4-oxide compounds is carried out by employing known techniques well within the skill of the art. Compounds of Formula XX-a and their pharmaceutically acceptable acid addition salts are useful as anticonvulsants.

Similarly, compounds of Formula XXI can be deoxygenated with phosphorous trichloride to form known benzodiazepines of the formula

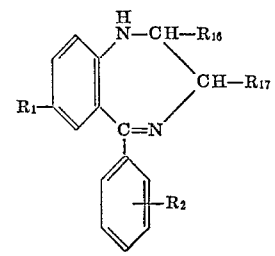

XXI-a wherein $R_1$, $R_2$, $R_{16}$ and $R_{17}$ have the same significance as hereinbefore.

As stated above the compounds of Formula XXI–a are known pharmaceutically valuable compounds. Compounds of Formula XXI wherein $R_{16}$ is hydrogen can be converted to known pharmaceutically useful benzodiazepin-2-one 4-oxides by methods known to the art such as by oxidizing with manganese dioxide. The invention thus provides a novel method of preparing known pharmaceutically valuable benzodiazepines from benzophenone oxime starting materials via the novel chemical intermediates of this invention. The novel method for the preparation of these known benzodiazepines and the novel chemical intermediates useful in such preparation can be more fully understood with respect to the following schematic diagram.

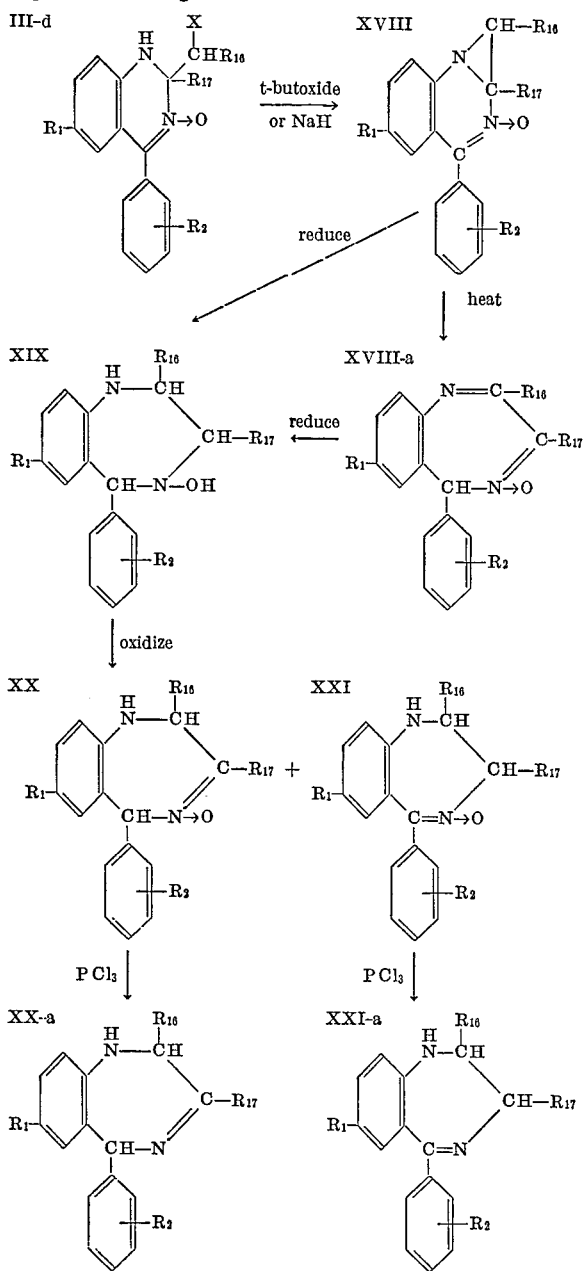

Flowsheet E wherein $R_1$, $R_2$, $R_{16}$, $R_{17}$ and X have the same significance as hereinabove.

Compounds of Formulas XVIII, XVIII–a, XIX, XX, XX–a and XXI form acid addition salts with either organic or inorganic acids such as acetic acid, succinic acid, maleic acid, hydrohalic acids, e.g., hydrochloric acid and hydrobromic acid, sulfuric acid, phosphoric acid and the like. Acid addition salts of the compounds of Formulas XVIII to XXI above can be converted into either the free base or into pharmaceutically acceptable acid addition salts by conventional techniques, for example, by neutralization, and then, if desired, by reaction with a pharmaceutically acceptable acid.

Compounds of Formula XX–a which, as set forth above, are pharmaceutically useful compounds, can be administered internally, for example, orally or parenterally, with dosage adjusted to individual requirements. For purposes of administration, they can be placed in conventional solid or liquid pharmaceutical administration forms and can be combined with conventional pharmaceutical solid or liquid carriers. For example, said compounds of Formula XX–a or its pharmaceutically acceptable acid addition salts can be administered in conventional pharmaceutical administration forms, such as dispersions, capsules, emulsions, suspensions, tablets or the like and can be combined with conventional pharmaceutical carriers or excipients, such as corn starch, lactose or the like.

Compounds of Formulae XVIII, XVIII–a, XIX, XX and XXI are, as explained above, useful as chemical intermediates. They are, for example, useful in preparing pharmaceutically valuable compounds of Formulae XX–a and XXI–a, the latter of which are a known class of pharmaceutically valuable benzodiazepines.

The following examples are illustrative but not limitative of the invention. All temperatures are in degrees C. When it is specified that an oxime of "unspecified configuration" is utilized as a starting material, it is to be understood that this comprehends a mixture of the $\alpha$- and $\beta$-stereoisomers.

Example 1

The $\alpha$-oxime of 2-amino-5-chlorobenzophenone (10 g.), acetone (100 ml.) and cupric sulfate pentahydrate (0.5 g., finely ground) were heated under reflux for 2 hours. Yellow product soon began to crystallize out. The reaction mixture was cooled to room temperature and the product filtered off. It was resuspended in water (75 ml.), filtered and washed with water to remove copper sulfate, yielding 6-chloro-1,2-dihydro-2,2-dimethyl-4-phenylquinazoline 3-oxide as yellow prisms, M.P. 200–220°.

Example 2

2-aminobenzophenone oxime of unspecified configuration (454 g.), acetone (6 l.) and cupric sulfate pentahydrate (30 g., fine powder) were heated under reflux overnight. The mixture was cooled to room temperature and insoluble material filtered off. The filtrate was concentrated in vacuo to small volume and the pale yellow solid collected, which upon recrystallization from acetone yielded 1,2-dihydro-2,2-dimethyl-4-phenylquinazoline 3-oxide as pale yellow prisms, M.P. 206–208°.

Example 3

2-amino-5-nitrobenzophenone oxime of unspecified configuration (191.7 g., 0.746 mole), acetone (3 l.) and cupric sulfate pentahydrate (4 g., finely powdered) were heated under reflux overnight. The solution was concentrated to 1 l. under reduced pressure. The resulting solid was collected, washed with water to remove cupric sulfate, and recrystallized from acetone yielding 1,2-dihydro-2,2-dimethyl-6-nitro-4-phenylquinazoline 3-oxide, M.P. 200–205°, yellow prisms.

Example 4

The $\alpha$-oxime of 2-amino-5-trifluoromethylbenzophenone (2.0 g.), acetone (50 ml.), cupric sulfate (0.1 g. of pentahydrate) and acetic acid (2 drops) were heated under reflux for 21 hours. The solution was concentrated in vacuo and the residue crystallized from ether, collected, washed with water and recrystallized from 2-propanol yielding 1,2-dihydro-2,2-dimethyl-4-phenyl-6-trifluoro-

Example 5

6 - chloro-1,2-dihydro-2,2-dimethyl-4-phenylquinazoline 3-oxide (10 g.) was ground to a powder and stirred with 3 N hydrochloric acid (100 ml.) at room temperature for 2 hours. The resulting white solid was filtered off and suspended in water (100 ml.) The suspension was then neutralized with solid sodium carbonate, filtered, and the solid filtrate washed with water (100 ml.) by removing the solid from the filter and resuspending. The so-obtained pale yellow solid was recrystallized from benzene yielding a colorless material which was dissolved in ether (100 ml.) and washed with 10% sodium bicarbonate solution (50 ml.). The organic phase was dried (sodium sulfate) and evaporated in vacuo. The residue was then crystallized from benzene giving 2 - amino-5-chlorobenzophenone β-oxime as white plates, M.P. 129–132.5°.

Example 6

1,2 - dihydro-2,2-dimethyl-4-phenylquinazoline 3-oxide (10 g.) was finely ground and added to 3 N hydrochloric acid (250 ml.). After the suspension had been stirred for 1 hour 20 minutes, the solid was filtered off and suspended in water (150 ml.). The suspension was then neutralized with solid sodium carbonate, the product collected, washed with water and worked up as in Example 5 to give 2-aminobenzophenone β-oxime, M.P. 123–129°.

Example 7

1,2 - dihydro-2,2-dimethyl-6-nitro-4-phenylquinazoline 3-oxide (5.0 g.) was dissolved in boiling ethanol (100 ml.). Concentrated hydrochloric acid (2 ml.) was added and the mixture kept at reflux for 5 minutes. Cold water (100 ml.) was then added and after the mixture had stood for about 0.5 hour, the precipitate was collected, and washed with water (2×25 ml.). Recrystallization from aqueous ethanol yielded 2-amino-5-nitrobenzophenone β-oxime, M.P. 200–206°.

Example 8

1,2-dihydro - 2,2 - dimethyl-4-phenyl-6-trifluoromethylquinazoline 3-oxide (1.0 g.) in a finely divided state was added to 3 N hydrochloric acid (50 ml.) and the suspension stirred at room temperature for 45 minutes. The solid was filtered off and suspended in water (100 ml.). Since the product did not crystallize readily on the addition of sodium carbonate, methylene chloride (75 ml.) was also added. The aqueous phase was made alkaline with solid sodium carbonate, and the phases separated. After drying (sodium sulfate) the methylene chloride solution was concentrated to leave a yellow oil which was crystallized from benzene/hexane to give 2-amino-5-trifluoromethylbenzophenone β-oxime as an off-white solid, M.P. 113–116° (sinter at 110°).

Example 9

6' - chloro-1,3-dimethyl-4'-phenylspiro(piperidino-4,2'-(1'H)-quinazoline) 3-oxime (1.9 g.) was stirred with 3 N hydrochloric acid (50 ml.) for 1.5 hours. The resulting solid was filtered off and suspended in water (100 ml.). The suspension was then neutralized with solid sodium carbonate in the presence of some methylene chloride (to aid crystallization). The methylene chloride was boiled off and the yellow solid collected and recrystallized from benzene hexane yielding 2 - amino-5-chlorobenzophenone β-oxime melting at 129–132°.

Example 10

6 - chloro - 2,2 - bis(chloromethyl) - 1,2 - dihydro - 4-phenylquinazoline 3-oxide (5 g.), dioxane (25 ml.) and methanolic hydrogen chloride (4 ml. of 7M) were heated under reflux for 40 minutes. The mixture was cooled, diluted with ether (100 ml.) and allowed to stand overnight. The precipitate was collected, and suspended in water. The suspension was then neutralized with solid sodium carbonate and the resulting solid collected and recrystallized from benzene/hexane yielding 2 -amino - 5-chlorobenzophenone β-oxime, M.P. 124–131°.

Example 11

A solution of p-toluenesulfonic acid (1 g. of monohydrate) and pyridine (1 ml.) in ethanol (250 ml.) and benzene (125 ml.) was rendered anhydrous by distillation of solvent until 250 ml. remained. 2-amino-5-chlorobenzophenone β-oxime (50 g.) and chloro-2-propanone (25 ml. technical) were added and the solution allowed to stand overnight at room temperature. After the solution had been concentrated in vacuo, the product, 6-chloro - 2 - chloromethyl - 1,2 - dihydro - 2 - methyl - 4-phenylquinazoline 3-oxide, was collected. Upon two recrystallizations from methylene chloride/petroleum ether it melted at 157–159°.

Example 12

6 - chloro - 1,2 - dihydro - 2,2 - dimethyl - 4 - phenylquinazoline 3-oxide (200 g.) and chloro 2-propanone (200 ml.) were added to ethanol (2 l.) benzene (0.5 l.) and concentrated hydrochloric acid (2 ml.). Solvent was then distilled from the mixture through a Vigreaux column. In the course of 80 minutes, 1.5 l. was collected. The reaction mixture was cooled, neutralized with 2 N ammonium hydroxide and the product precipitated with ice water (1 l.). The precipitate was collected and washed with ethanol and then ether to give 6 - chloro - 2-chloromethyl - 1,2 - dihydro - 2 - methyl - 4 - phenylquinazoline 3-oxide as a yellow solid, M.P. 150–158° (dec.).

Example 13

1,2 - dihydro - 2,2 - dimethyl - 4 - phenylquinazoline 3-oxide (5.0 g.) ethanol (50 ml.), chloroacetone (5 ml. of technical) and concentrated hydrochloric acid (0.05 ml.) were mixed, and solvent was distilled out for 45 minutes while ca. 20 ml. was collected. The solution was cooled, neutralized with 1 N sodium hydroxide, and diluted with water to a total volume of ca. 60 ml. The pale yellow precipitate was collected, washed with water, and recrystallized three times for ethyl acetate yielding 2-chloromethyl - 1,2 - dihydro - 2 - methyl - 4 - phenylquinazoline 3-oxide as pale yellow spars, M.P. 158–161° (dec.)

Example 14

1,2 - dihydro - 2,2 - dimethyl - 6 - nitro - 4 - phenylquinazoline 3-oxide (25 g.), ethanol (250 ml.), concentrated hydrochloric acid (0.2 ml.) and chloroacetone (25 ml. of technical) were mixed, and the solvent distilled out for 25 minutes. The distillate amounted to 178 ml. The residue was cooled on ice and the precipitate was collected yielding 2-chloromethyl-1,2-dihydro-2-methyl-6-nitro-4-phenylquinazoline 3-oxide as yellow prisms, M.P. 218–221° upon three recrystallizations from ethanol.

Example 15

2 - amino - 5 - chlorobenzophenone β-oxime (10.0 g.) was dissolved in methanol (100 ml.), cooled to 10° and methanolic hydrogen chloride (5 ml. of 1 N) and a solution of 1,3-dichloropropanone (7.74 g.) in methanol (25 ml.) were added. The reaction mixture was allowed to warm to room temperature and let stand at that temperature (ca. 25°) for 0.5 hour. Crystallization occurred after approximately 15 minutes. The mixture was then cooled on ice and the resulting solids collected and washed with hexane yielding 6 - chloro - 2,2 - bis(chloromethyl)-1,2-dihydro-4-phenylquinazoline 3-oxide which upon three recrystallizations from ethyl acetate was obtained as yellow needles, M.P. 171–172°.

Example 16

6 - chloro - 1,2 - dihydro - 2,2 - dimethyl - 4 - phenylquinazoline 3-oxide (200 g.), 1,3-dichloropropanone (200 g.), ethanol (2 l.), benzene (400 ml.), and concentrated hydrochloric acid (2 ml.) were combined and solvent distilled off. During 1 hour, 1.2 l. of solvent was collected. The reaction mixture was then cooled on ice and neutralized with 2 N ammonium hydroxide (40 ml.). The resulting solid product was collected and washed with 1:1 ether/ethanol (200 ml.) yielding 6-chloro-2,2-bis(chloromethyl) - 1,2 - dihydro - 4 - phenylquanizoline 3-oxide, M.P. 169–171°.

Example 17

A solution of 10 g. of 2-amino-5-chlorobenzophenone β-oxime in 100 ml. of acetone containing 2 drops of glacial acetic acid was heated under reflux for 20 min. The reaction mixture was cooled to 0° and the yellow solid, 6 - chloro - 1,2 - dihydro - 2,2 - dimethyl - 4 - phenylquinazoline 3-oxide, which separated was collected. Upon crystallization from methylene chloride/acetone, it formed yellow rods, M.P. 221–222°.

Example 18

2 - amino - 5 - chlorobenzophenone oxime of unspecified configuration (300 g.) was refluxed with mechanical stirring with acetone (3 l., C.P.) wth the addition of cupric sulfate (15 g. of pulverized pentahydrate) and glacial acetic acid (3 ml.) for 7–8 hr. After 2–3 hr., yellow crystals of 6 - chloro - 1,2 - dihydro - 2,2 - dimethyl - 4-phenylquinazoline 3-oxide began to precipitate from the brown solution. The reaction mixture was then allowed to cool to room temperature overnight. The product was filtered off and washed with water (2× ca. 200 ml.) to remove the cupric sulfate, yielding 6-chloro-1,2-dihydro-2,2 - dimethyl - 4 - phenylquinazoline-3-oxide as yellow prisms.

Example 19

Chloroacetaldehyde diethylacetal (46 ml.) was heated under reflux for 15 min. with 1.5 N hydrochloric acid (46 ml., 0.069 mole). This solution was cooled to 10° and added to a cold (10°) solution of 2-amino-5-chlorobenzophenone β-oxime (49.3 g.) prepared by dissolving the oxime in warm ethanol (100 ml.) and cooling. The mixture was stirred without further cooling for 15 min. (reaction is exothermic). The product, 2-chloromethyl-6-chloro-1,2-dihydro-4-phenylquinazoline 3-oxide, separated and was collected and washed with hexane. Upon three recrystallizations from 2-propanol, it melted at 165–167°, yellow plates.

Example 20 p-Toluenesulfonic acid monohydrate (100 g.), ethanol (1.5 l.), pyridine (100 ml.) and benzene (250 ml.) were combined. Solvent (250 ml.) was distilled out and to the residue was added 2-amino-5-chlorobenzophenone β-oxime (100 g.) and 1-methyl-4-piperidone (70 ml., ca. 0.6 mole). This mixture was refluxed 16 hr., concentrated in vacuo to ½ its volume and cooled overnight. 6′-chloro-1-methyl-4-phenylspiro[piperidino - 4,2′ - (1′ H)-quinazoline] 3-oxide p-toluenesulfonate separated in the form of a yellow solid which was collected.

The p-toluenesulfonate salt (11.1 g.) was suspended in water (200 ml.) and ethanol (50 ml.). Sodium hydroxide (22 ml. of 1 N) was added. The precipitate was collected and recrystallized from ethanol (30 ml.) and water (50 ml.) to give yellow spars of 6′-chloro-1-methyl-4′-phenylspiro[piperidino-4,2′(1′ H)quinazoline] 3-oxide which upon three recrystallizations from aqueous ethanol gave yellow spars, M.P. 211–214°. By crystallizing an equimolar mixture of the free base and p-toluenesulfonic acid from ethanol, the p-toluenesulfonic salt was obtained in the form of yellow prisms, M.P. 212–216° (sinter 195°).

Example 21 p-Toluenesulfonic acid monohydrate (100 g.), ethanol (1.5 l.), pyridine (100 ml.) and benzene (250 ml.) were combined. Solvent (250 ml.) was distilled out and to the residue was added 2-amino-5-chlorobenzophenone β-oxime (100 g.) and 1,3-dimethyl-4-piperidone (80 ml., ca. 0.63 mole). This mixture was refluxed overnight. After the mixture had cooled, 6′-chloro-1,3-dimethyl-4′-phenylspiro[piperidino-4,2′(1′ H)-quinazoline] 3-oxide p-toluenesulfonate which had separated as a yellow solid, was collected and washed with ether. Upon three recrystallizations from ethanol, it formed yellow prisms melting at 230–234°.

Example 22

Piperidinoacetone was prepared by adding chloroacetone (8 ml., technical, ca. 75 mmole) dropwise to a solution of piperidine (20 ml., 0.202 mole) in ether (50 ml., anhydrous). The mixture was refluxed 0.5 hr., the piperidine hydrochloride was filtered off, and washed with ether, and the filtrate concentrated in vacuo to leave oily residue (12.77 g.) which was used without further purification. To this was added 2-amino-5-chlorobenzophenone β-oxime (17 g.) in ethanol, then concentrated hydrochloric acid (10 ml.) to adjust the pH of the solution to 1–3, and finally benzene (100 ml.). A portion of the solvent (150 ml.) was distilled out, and the mixture allowed to stand overnight. The yellow solid which separated was collected and partitioned between methylene chloride and 10% sodium carbonate solution. The methylene chloride extract was dried and concentrated in vacuo. The residue crystallized from ether to yield 6-chloro-1,2-dihydro-2-methyl - 4 - phenyl-2-(piperidinomethyl)quinazoline 3-oxide as a yellow solid, which upon three recrystallizations from ethanol formed yellow prisms, M.P. 193–194°.

The free base, 6-chloro-1,2-dihydro-2-methyl-4-phenyl-2-(piperidinomethyl)quinazoline 3-oxide (3.7 g.), was dissolved in methanol (100 ml.), the solution was filtered and maleic acid (1.16 g.) added to it. The solution was then diluted with ether (500 ml.) and the pale yellow needles of 6-chloro-1,2-dihydro-2-methyl-4-phenyl-2-(piperidinomethyl) - quinazoline 3-oxide maleate which formed, collected and crystallized three times from methanol/ether, yielding yellow prisms, M.P. 115–130° (dec.).

Example 23

2-amino-5-chlorobenzophenone β-oxime (50 g.) was dissolved in methanol (250 ml.) and the solution cooled to 5°. Acetic acid (5 ml.) and acetaldehyde (20 ml.) were added (exothermic reaction). The mixture was kept on ice approximately 1 hr. and the product, 6-chloro-1,2-dihydro-2-methyl-4-phenylquinazoline 3-oxide, which separated was collected. After recrystallization from 2-propanol/water and then three times from 2-propanol, it melted at 174–176° (dec.).

Example 24

6-chloro - 1,2 - dihydro-2,2-dimethyl-4-phenylquinazoline 3-oxide (5 g.) was dissolved in chloroform (100 ml.) and phosphorus trichloride (2 ml.) in chloroform (20 ml.) and the mixture was heated under reflux for 0.5 hr. The resultant red solution was poured into 1.2 N sodium hydroxide (100 ml.). The phases were separated and the chloroform washed with 10% sodium bicarbonate solution (50 ml.) and brine (50 ml.) and dried (sodium sulfate). The solution was then filtered through alumina (50 g.), and the alumina washed with methylene chloride (100 ml.). The eluate was concentrated in vacuo and the residue crystallized from hexane to give 6-chloro-1,2-dihydro-2,2-dimethylquinazoline as a yellow solid which upon repeated crystallization from ethanol/water and hexane/ether formed yellow needles melting at 142–144.5°.

The so-formed free base (3.3 g.) was dissolved in ethanol (30 ml.) and then 10 N methanolic HCl (2 ml.) and ether (200 ml.) added. The precipitated 6-chloro-1,2-dihydro-2,2-dimethyl-4-phenylquinazoline hydrochloride had a M.P. 120–125° (dec.), orange needles.

Example 25

6-chloro-1,2-dihydro-2,2-dimethylquinazoline (5.0 g.) was dissolved in methanol (400 ml.) and the solution cooled on ice. Sodium borohydride (2.5 g.) was added. The mixture was stirred 6 hrs. on ice. It was then neutralized with acetic acid and concentrated to dryness in vacuo. The residue was dissolved in methylene chloride (200 ml.) and the solution washed with water (100 ml.) and dried over sodium sulfate. Concentration in vacuo left a pale yellow oil. A portion of this oil (2.73 g.) was dissolved in methanol (10 ml.) and treated with 10 N methanolic hydrogen chloride (1 ml.) and ether (80 ml.). 6 - chloro-2,2-dimethyl-4-phenyl-1,2,3,4-tetrahydroquinazoline hydrochloride separated as a yellow solid, which was collected and melted at 220–240° (dec.).

Example 26

The β-oxime of 2-amino-5-chlorobenzophenone (12.3 g.) was dissolved in hot ethanol (25 ml.). Cyclohexanone (6 ml.), acetic acid (0.5 ml.) and 3 N hydrochloric acid (3 drops) were then added, and the mixture warmed on a steam bath for about 5 min. The mixture was cooled and the product, 6'-chloro-4'-phenylspiro[cyclohexane-1,2'(1'H)-quinazoline] 3-oxide, which separated was collected. Upon two recrystallizations from ethanol, it formed yellow prisms melting at 215–221°.

Example 27

A mixture of 5-chloro-2-methylaminobenzophenone oxime (mixture of stereo isomers) (10 g.), cupric sulfate pentahydrate (0.1 g.), acetone (100 ml.) and chloroform (100 ml.) was refluxed overnight while passing the distillate through a Soxhlet extractor containing anhydrous sodium sulfate. The cupric sulfate was filtered off and the solvents then removed in vacuo. The residue was crystallized from ethyl acetate. Recrystallization from petroleum ether and from ethanol/water gave 6-chloro-1,2-dihydro-1,2,2-trimethyl-4-phenylquinazoline 3-oxide as yellow rods of M.P. 115–116°.

Example 28

6-chloro - 1,2 - dihydro-2,2-dimethyl-4-phenylquinazoline 3-oxide (57.4 g.) was suspended in tetrahydrofuran (2 l.) and the mixture cooled to 7°. To this mixture was added potassium t-butoxide (25 g.). The mixture was stirred 3 min. and methyl iodide (50 ml.) was added. The mixture was stirred a further 15 min. during which time the color faded from red to yellow, and then filtered through Celite. The filtrate was evaporated in vacuo and the residue treated with hexane to give a sticky yellow solid which was recrystallized from ethanol/water to give crude 6 - chloro-1,2-dihydro-1,2,2-trimethyl-4-phenylquinazoline 3-oxide.

Example 29

6-chloro - 1,2 - dihydro-1,2,2-trimethyl-4-phenylquinazoline 3-oxide (10 g.), ethanol (150 ml.) chloroacetone (10 ml. tech.) and concentrated hydrochloric acid (0.3 ml.) were heated together with slow distillation of solvent for 1.5 hr. A total of 100 ml. of distillate was collected. The residue was diluted with ether (250 ml.) and washed with water (3 × 250 ml.). The ether solution was dried over sodium sulfate and concentrated in vacuo to give a yellow-brown tar which was crystallized from ether to give 6-chloro-2-chloromethyl-1,2-dihydro-1,2-dimethyl-4-phenylquinazoline 3-oxide which by two recrystallizations from cyclohexane, was obtained as yellow prisms, M.P. 118–120°.

Example 30

A mixture of 6-chloro-1,2-dihydro-1,2,2-trimethyl-4-phenylquinazoline 3-oxide (5.0 g.) and 3 N hydrochloric acid (25 ml.) was heated on the steam bath for 3 min. A red oil formed, and then the mixture solidified to an orangish mass. The solid was collected after the mixture was cooled. The solid was added to saturated sodium bicarbonate solution (50 ml.) and ether (100 ml.). The ether layer was washed with brine (50 ml.) and dried over sodium sulfate. The residue from evaporation of the ether solution, was crystallized from hexane to give 5-chloro-2-methylaminobenzophenone β-oxime as pale yellow needles, which upon recrystallization from hexane melted at 91–93°.

Example 31.—Preparation of 6-chloro-2-trichloromethyl-1,2-dihydro-4-phenylquinazoline 3-oxide A mixture of 24.65 g. (0.1 mole; 0.07 mole β-isomer) of crude 2-amino-5-chlorobenzophenone β-oxime, 33.1 g. (0.2 mole) of chloral, 0.5 g. of p-toluenesulfonic acid and 500 ml. of benzene was refluxed under a Dean-Stark water separator for 4 hrs. During this time 5.2 ml. of water was collected. The reaction mixture was then cooled in an ice bath and the 6-chloro-2-trichloromethyl-1,2-dihydro-4-penylquinazoline 3-oxide product was collected and washed with petroleum ether, M.P. 203–210°.

An analytical sample was obtained as yellow prisms, M.P. 180–210° (dec.) on repeated recrystallization from pyridine/water.

Example 32.—Preparation of 6-chloro-2-dichloromethyl-1,2-dihydro - 4 - phenylquinazoline 3-oxide from dichloroacetaldehyde and the β-oxime of 2-amino-5-chlorobenzophenone Dichloroacetaldehyde polymer was depolymerized by heating 200 g. of the commercial polymer in an oil bath at 180° and collecting the distillate. The fraction boiling between 90–120° which amounted to 171.5 g. (1.52 moles) was combined with 492.5 g. (2 moles) of 2-amino-5-chlorobenzophenone β-oxime in 1.3 l. of ethanol. This mixture was warmed for about 5 min. on the steambath at which time the product began to crystallize. The mixture was then cooled in the refrigerator; the bright yellow 6 - chloro-2-dichloromethyl-1,2-dihydro-4-phenylquinazoline 3-oxide was collected and washed with small portions of ethanol, ether and petroleum ether successively, M.P. 200–201°.

An analytical sample of the product was obtained as yellow needles, M.P. 203–206°, by recrystallization from tetrahydrofuran/water.

Example 33.—Preperation of 6-chloro-2-dichloromethyl-1,2-dihydro-4-phenylquinazoline 3-oxide from dichloroacetaldehyde and 6-chloro-1,2-dihydro-2,2-dimethyl-4-phenylquinazoline 3-oxide A mixture of 10 g. (34.8 mmole) of 6-chloro-1,2-dihydro-2,2-dimethyl-4-phenylquinazoline 3-oxide, 100 ml. of ethanol, 50 ml. of benzene and 10 ml. (approx. 100 mmoles) of crude distilled dichloroacetaldehyde was heated for 45 min. while 100 ml. of solvent was distilled off. The dichloroacetaldehyde contained enough acid to catalyze the reaction. The mixture was cooled and the yellow 6 - chloro-2-dichloromethyl-1,2-dihydro-4-phenylquinazoline 3-oxide product collected, M.P. 195–198° (dec.).

Example 34.—Preparation of 6-chloro-2-dichloromethyl-1,2-dihydro-4-phenylquinazoline 3-oxide from dichloroacetaldehyde polymer and 6-chloro-1,2-dihydro-2,2-dimethyl-4-phenylquinazoline 3-oxide A mixture of 14.3 g. (50 mmoles) of 6-chloro-1,2-dihydro-2,2-dimethyl-4-phenylquinazoline 3-oxide, 150 ml. of ethanol and 6.78 g. (containing 60 mmoles of monomeric dichloroacetaldehyde) of dichloroacetaldehyde polymer were heated for 30 min. while 70 ml. of solvent was distilled off. The residual mixture was cooled; the yellow crystalline 6-chloro-2-dichloromethyl-1,2-dihydro-4-phenylquinazoline 3-oxide product filtered off and washed with ether and petroleum ether, M.P. 205–207°.

Example 35.—Preparation of 6-chloro-2-dichloromethyl-1,2-dihydro-4-phenylquinazoline 3-oxide from β-oxime of 2-amino-5-chlorobenzophenone and dichloroacetaldehyde polymer A mixture of 9.86 g. (40 mmole) of 2-amino-5-chlorobenzophenone β-oxime, 5.65 g. dichloroacetaldehyde polymer (50 mmoles of dichloroacetaldehyde) and 125 ml. of ethanol was refluxed for 15 min. After the mixture had been cooled on ice, the 6-chloro-2-dichloromethyl-1,2-dihydro-4-phenylquinazoline 3-oxide product was collected and washed with ethanol and ether, M.P. 204–206°.

Example 36.—Preparation of 6-chloro-2-dichloromethyl-1,2-dihydro-4-phenylquinazoline 3-oxide from crude oxime of 2-amino-5-chlorobenzophenone and dichloroacetaldehyde A mixture of 6.15 g. (25 mmoles) of α- and β-oximes of 2-amino-5-chlorobenzophenone, 4 g. (35 mmoles) of distilled crude dichloroacetaldehyde, 50 ml. ethanol and 0.1 g. anhydrous cupric sulfate was heated under reflux 22.5 hrs. and then was cooled in the refrigerator. The 6-chloro-2-dichloromethyl - 1,2 - dihydro - 4 - phenylquinazoline 3-oxide, obtained as a yellow precipitate, was collected and washed with ethanol, M.P. 195–200° (dec.).

Example 37.—Preparation of 7-chloro-2-methylamino-5-phenyl-3H-1,4-benzodiazepine 4-oxide from 6-chloro-2-dichloromethyl-1,2-dihydro - 4 - phenylquinazoline 3-oxide A solution of 3.4 g. (10 mmoles) of 6-chloro-2-dichloromethyl-1,2-dihydro-4-phenylquinazoline 3-oxide in 100 ml. of liquid methylamine was stirred under a Dry Ice condenser for 2.5 hrs. and then the methylamine was allowed to evaporate slowly overnight. The residue was dissolved in 200 ml. of methylene chloride, the solution washed with a mixture of 50 ml. of 10 percent sodium carbonate solution and 50 ml. of ice and the methylene chloride phase dried over sodium sulfate. The solvent was removed in vacuo to give a yellow oil from which on addition of ether there was obtained 7-chloro-2-methylamino-5-phenyl-3H-1,4-benzodiazepine 4 - oxide, M.P. 220–230° (sinters 190°). Recrystallization from about 15 ml. of ethanol gave the pure product.

Example 38.—Preparation of 7-chloro-2-methylamino-5-phenyl-3H-1,4-benzodiazepine 4-oxide from 6-chloro-2-dichloromethyl-1,2-dihydro - 4 - phenylquinazoline 3-oxide Into a suspension of 10 g. (29 mmole) of 6-chloro-2-dichloromethyl-1,2-dihydro-4-phenylquinazoline 3-oxide in 250 ml. of methanol was bubbled gaseous methylamine for 5 hrs. The heat of reaction caused the methanol to reflux. A clear solution was formed which was allowed to stand at room temperature for 11 hrs., and was then concentrated in vacuo. The residue was partitioned between 250 ml. of methylene chloride and 250 ml. of 10 percent sodium carbonate solution. The methylene chloride phase was dried over sodium sulfate and concentrated in vacuo to give 11.9 g. of an orange solid. This was treated with ether to give 7-chloro-2-methylamino-5-phenyl-3H-1,4-benzodiazepine 4-oxide. Recrystallization from ethanol gave the product, melting at 236–236.5°.

Example 39.—Conversion of 6-chloro-2-dichloromethyl-1,2-dihydro-4-phenylquinazoline 3-oxide to 6-chloro-2-chloromethyl-4-phenylquinazoline 3-oxide To a solution of 13.6 g. (40 mmole) of 6-chloro-2-dichloromethyl-1,2-dihydro-4-phenylquinazoline 3-oxide in 500 ml. of dry tetrafuran cooled in a Dry Ice/acetone bath was added 4.48 g. (40 mmole) of potassium t-butoxide. The mixture was removed from the cooling bath and allowed to stand overnight at room temperature. It was then filtered through Celite and the filtrate concentrated in vacuo to give a yellow oil which was dissolved in methylene chloride and washed three times with water and then with brine. The methylene chloride solution was dried over sodium sulfate and filtered through alumina (Woelm). The effluent was concentrated in vacuo and the residue crystallized from ether and then from cyclohexane to give 6-chloro-2-chloromethyl-4-phenylquinazoline 3-oxide, M.P. 109–112°.

Example 40

A suspension of 10 g. (29.2 mmole) of 6-chloro-2-dichloromethyl-1,2-dihydro-4-phenylquinazoline 3-oxide in 300 ml. of refluxing ethanol was treated with 60 ml. of 1 N aqueous sodium hydroxide. This mixture was heated under reflux for 35 min., cooled on ice and concentrated in vacuo. The residue was partitioned between 200 ml. of methylene chloride and 200 ml. of water. After the mixture had been acidified with acetic acid, the methylene chloride phase was separated and the aqueous phase washed with 50 ml. of methylene chloride. The combined methylene chloride extracts were washed with 200 ml. of water and dried over sodium sulfate. Evaporation of the solvent in vacuo gave the 7-chloro-1,3-dihydro-5-phenyl-2H-1,4-benzodiazepin-2-one 4-oxide product melting at 225–230° (dec.).

Example 41.—Oxidation of 6-chloro-2-dichloromethyl-1,2-dihydro-4-phenylquinazoline 3-oxide to 6-chloro-2-dichloromethyl-4-phenylquinazoline 3-oxide To a solution of 1.8 g. (6 mmoles) of sodium dichromate dihydrate in 50 ml. of acetic acid was added 5 g. (14.7 mmole) of 6-chloro-2-dichloromethyl-1,2-dihydro-4-phenylquinazoline 3-oxide. The solution rapidly turned dark green. The product was precipitated with 100 ml. of water and collected to give crude 6-chloro-2-dichloromethyl - 4 - phenylquinazoline 3-oxide which was dissolved in methylene chloride and passed through a short column of Woelm alumina. Concentration in vacuo of the first 250 ml. of eluate left the pure product, M.P. 150–153°.

Example 42.—Oxidation of 6-chloro-2-chloromethyl-1,2-dihydro-4-phenylquinazoline 3-oxide to 6-chloro-2-chloromethyl-4-phenylquinazoline 3-oxide To a solution of 1.8 g. (6 mmoles) of sodium dichromate dihydrate in 50 ml. of acetic acid was added 5.0 g. (16.3 mmoles) of 6-chloro-2-chloromethyl-1,2-dihydro-4-phenylquinazoline 3-oxide. The mixture was stirred two minutes, diluted with 150 ml. of water and extracted with 300 ml. of methylene chloride. The methylene chloride extract was washed with brine, dried over sodium sulfate and concentrated in vacuo leaving a brown oil. This oil was washed through a short column of alumina with 250 ml. of methylene chloride. Concentration of the methylene chloride eluate left off-white crystals of 6-chloro-2-chloromethyl-4-phenylquinazoline 3-oxide, M.P. 126–130°. This was recrystallized from chloroform/hexane to give the pure product melting at 128–130°.

Example 43

A solution of 15 ml. of 2 N sodium hydroxide in 100 ml. of 1,2-dimethoxyethane was chilled to 0–5° and 5.0 g. (14.7 mmoles) of 6-chloro-2-dichloromethyl-4-phenylquinazoline 3-oxide were added. After 30 minutes at this temperature, 100 ml. of water was added slowly, keeping the temperature below 10°. Then 3 N hydrochloric acid was added dropwise until the solution was neutral. The crystalline product was filtered off, washed with water and dried over phosphorus pentoxide in vacuum to give 3,7-dichloro-1,3-dihydro-5-phenyl-2H-1,4 - benzodiazepin-2-one 4-oxide, melting at 194–195° dec. Recrystallization from a mixture of tetrahydrofuran and hexane gave colorless needles melting at 210–211°.

Example 44

A solution of 5.0 g. (15.5 mmoles) of 3,7-dichloro-1,3-dihydro-5-phenyl-2H-1,4-benzodiazepin-2-one 4-oxide in 100 ml. of chloroform and 10 ml. of phosphorus trichloride was heated to reflux for 30 minutes. The mixture was then concentrated to dryness in vacuo and the residue partitioned between chloroform and water. The organic layer was washed with water and dilute sodium bicarbonate and, following drying over sodium sulfate, concentrated to dryness in vacuo. The crude product thus obtained was dissolved in 100 ml. of acetic acid containing 3.0 g. of anhydrous sodium acetate and the solution heated at 80–90° for 10 minutes. Acetic acid was distilled off in vacuo and the residue partitioned between chloroform and water. The chloroform layer was washed with water and dilute sodium bicarbonate, dried over sodium sulfate and the solvent was then distilled off in vacuo. The residue was crystallized from a mixture of methylene chloride and hexane to give 3-acetoxy-7-chloro-1,3-dihydro-5-phenyl-2H-1,4-benzodiazepin-2-one, melting at 230–236° dec.

Example 45

A solution of 6.4 g. (20 mmole) of 6-chloro-2-chloromethyl-1,2-dihydro-2-methyl-4-phenylquinazoline 3-oxide in 200 ml. of ethanol and 20 ml. of 1 N sodium hydroxide was heated under reflux for 1 hr. The solution was diluted with 500 ml. of water and set aside to cool. Filtration gave 7-chloro-2-methyl-5-phenyl-3H-1,4-benzodiazepine 4-oxide in the form of a yellowish solid, M.P. 164–168° (dec.). For analysis it was recrystallized four times from ethanol to give colorless needles, M.P. 163–165° (dec.).

Example 46

A solution of 3.21 g. (10 mmole) of 6-chloro-2-chloromethyl-1,2-dihydro-2-methyl-4-phenylquinazoline 3-oxide in 100 ml. of tetrahydrofuran was cooled in a Dry Ice/acetone bath and 1.0 g. (0.9 mmole) of potassium t-butoxide was added. The mixture was allowed to warm to room temperature for 1 hr. The reaction mixture was then filtered through Celite using methylene chloride to wash the filter and the filtrate concentrated in vacuo to leave 3 g. of yellow solid which was dissolved in ether and filtered through 100 g. of alumina. The material which was eluted with 1 l. of ether was crystallized from methylene chloride/hexane by displacing the methylene chloride with hexane from a boiling solution to give 7-chloro-3-methyl-5-phenyl-5H-1,4-benzodiazepine 4-oxide as a tan solid, M.P. 170–175°. This product was dissolved in methylene chloride and passed through 5 g. of alumina. The methylene chloride was displaced with hexane from a boiling solution. The pale yellow prisms which separated had M.P. 173–176° Another crystallization from methylene chloride/hexane gave an analytical sample of M.P. 169–170°

Example 47

A suspension of 28.5 g. (0.1 mole) of 7-chloro-2-methyl-5-phenyl-3H-1,4-benzodiazepine 4-oxide in 400 ml. of ethanol was hydrogenated at atmospheric pressure and room temperature using 64.5 g. of wet Raney nickel until 5.5 l. were taken up (2 molar equivalents require 4.8 l.). The catalyst was filtered off and the filtrate concentrated in vacuo to 31.4 g. of red oil. This oil was filtered through 300 g. of alumina using 500 ml. of methylene chloride to elute. The residue left on evaporation of the methylene chloride solution crystallized on treatment with hexane to give 7-chloro-2,3-dihydro-2-methyl-5-phenyl-1H-1,4-benzodiazepine, M.P. 135–142°. Two recrystallizations from ethyl acetate raised the M.P. to 144–147°.

A solution of 2.0 g. (7.38 mmole) of 7-chloro-1,2-dihydro-2-methyl-5-phenyl-3H-1,4-benzodiazepine in 10 ml. of methanol was treated with 1 ml. of ca. 10H methanolic hydrogen chloride and 125 ml. of ether. Filtration gave 7-chloro-1,2-dihydro-2-methyl-5-phenyl - 3H - 1,4-benzodiazepine hydrochloride as yellow-orange needles, M.P. 260–265° (dec.).

Example 48

A solution of 35 g. (0.124 mole) of 7-chloro-2-methyl-5-phenyl-3H-1,4-benzodiazepine 4-oxide in 750 ml. of warm methanol was cooled in an ice bath to below 10°. After 7.5 g. (0.23 mole) of sodium borohydride had been added, the mixture was stirred in an ice bath for 1 hour. The mixture was neutralized with acetic acid and concentrated to small volume in vacuo. After 48 hr. solid 7-chloro - 2-,3-dihydro - 2-methyl-5-phenyl-1H-1,4-benzodiazepine 4-oxide, M.P. 195–202°, was collected and washed with water. On recrystallization from ethanol, the product melted at 200–203°. An analytical sample was obtained as off-white prisms, M.P. 200–202.5° by three recrystallizations from ethanol.

A solution of 2.0 g. (7 mole) of 7-chloro-2,3-dihydro-2-methyl-5-phenyl-1H-1,4-benzodiazepine 4-oxide in 50 ml. of ethanol was treated with 0.7 ml. of approximately 10 M methanolic hydrogen chloride and 50 ml. of ether. The precipitate was collected and recrystallized twice from ethanol/ether to give fine yellow-orange needles of 7-chloro-2,3-dihydro-2-methyl - 5-phenyl-1H-1,4-benzodiazepine 4-oxide hydrochloride, M.P. 185–193° (dec.).

Example 49

A solution of 6.1 g. (21.5 mmole) of 7-chloro-2-3-dihydro-2-methyl - 5-phenyl-1H-1,4-benzodiazepine 4-oxide and 7 ml. (80 mmole) of phosphorus trichloride in 150 ml. of chloroform was heated under reflux for 0.5 hr. in the presence of 12 g. of anhydrous sodium carbonate. The reaction mixture was poured in 350 ml. of 10 percent sodium carbonate solution and 150 g. of ice. To this was added 150 ml. of methylene chloride; the mixture was shaken and the phases separated. The aqueous phase was washed with 100 ml. of methylene chloride which was added to the original organic phase. The combined organic extracts were washed with 50 ml. of 10 percent sodium carbonate solution and with 100 ml. of brine and dried over sodium sulfate. The residue left on concentrating the solution in vacuo was filtered through 100 g. of alumina and the oil eluted with 250 ml. of methylene chloride was crystallized from ether to give 7-chloro-1,2-dihydro-2-methyl-5-phenyl-3H-1,4-benzodiazepine, M.P. 143–147°. An analytical sample was obtained as off-white prisms, M.P. 146–147.5° by three recrystallizations from ethyl acetate.

Example 50

A solution of 7-chloro-1,2-dihydro-2-methyl-5-phenyl-3H-1,4-benzodiazepine was prepared by dissolving 1.0 g. (3.26 mmole) of its hydrochloride in 100 ml. of chloroform, washing the solution with 100 ml. of 10 percent sodium bicarbonate solution and drying over sodium sulfate. The sodium sulfate was filtered from the solution and washed with chloroform. The combined chloroform solution was stirred for 18 hr. at room temperature with 10 g. of activated manganese dioxide. The manganese dioxide was filtered off and the filtrate concentrated in vacuo to an orange oil. This was dissolved in ether and filtered through 35 g. of alumina using 200 ml. of ether to wash. The ether was removed in vacuo and the residue crystallized from hexane to give prisms of 7-chloro-2-methyl-5-phenyl-3H-1,4-benzodiazepine, M.P. 125–132°. An analytical sample which was prepared by three crystallizations from hexane was obtained as colorless prisms, M.P. 132–135° (sl. dec).

Example 51

A solution of 4.68 g. (20 mmole) of 7-chloro-2-methyl-5-phenyl-3H-1,4-benzodiazepine 4-oxide in 300 ml. of ether was heated under reflux for 2 hr. with 1 g. (26.3 mmole) of lithium aluminum hydride. The reaction mixture became orange and then faded to a light green. Excess lithium aluminum hydride was decomposed with ethyl acetate and then 250 ml. of 10 percent potassium carbonate solution was added. The biphasic mixture was filtered through Celite. The two layers of the filtrate were separated and the aqueous one was washed with 200 ml. of ether. The combined ethereal extracts were dried over sodium sulfate and concentrated in vacuo to give 7-chloro-2,3,4,5-tetrahydro-2-methyl-5-phenyl-1H-1,4-benzodiazepine-4-ol, melting at 165–173°. An analytical sample was obtained by three recrystallization from ethanol as white prisms, M.P. 168–173.5°.

Example 52

A solution of 5.0 g. (17.5 mmole) of 7-chloro-2-methyl-5-phenyl-3H-1,4-benzodiazepin 4-oxide in 125 ml. of acetic anhydride was heated on the steam bath for 2 hr. The mixture was concentrated in vacuo and the residue dissolved in 100 ml. of ether. The solution was washed with 100 ml. of 10 percent sodium carbonate solution in two portions and 50 ml. of brine, dried over sodium sulfate, filtered through 40 g. of alumina and concentrated. The brownish residue was recrystallized from ethanol to give 3-acetoxy - 7-chloro - 2-methyl-5-phenyl-3H-1,4-benzodiazepine, M.P. 128–2300. Prolonged heating during recrystallization is to be avoided since this material is rather labile. Recrystallization from ethanol gave the analytical sample as buff prisms, M.P. 130–131.5°.

Example 53

A solution of 6.64 g. (20 mmole) of 3-acetoxy-7-chloro-2-methyl - 5 - phenyl-3H-1,4-benzodiazepine in 100 ml. of tetrahydrofuran was stirred overnight under nitrogen with 20 ml. of 1 N sodium hydroxide. The solution was concentrated in vacuo to remove most of the tetrahydrofuran. The residue was partitioned between 50 ml. of water and an organic phase composed of 50 ml. of ether and 100 ml. of methylene chloride. The organic layer was dried over sodium sulfate and evaporated to 6.6 g. of oil which was crystallized from ether to give 7-chloro-3-hydroxy-2-methyl-5-phenyl - 3H-1,4-benzodiazepine as an off-white solid, M.P. 119–122° (dec.). An analytical sample was obtained as off-white needles, M.P. 120–125° (dec.) by two crystallizations from alcohol/water.

Example 54

A solution of 6.05 g. (18.5 mmole) of 3-acetoxy-7-chloro-2-methyl-5-phenyl-3H-1,4-benzodiazepine in 500 ml. of methanol was cooled in an ice bath and treated with 3.0 g. of sodium borohydride. The mixture was stirred in an ice bath for 1 hr. 20 min. After neutralization with acetic acid, the solution was concentrated in vacuo and the residue dissolved in 250 ml. of methylene chloride. The methylene chloride solution was washed with 200 ml. of water in two portions and dried over sodium sulfate. After the solvent had been removed, the residue was treated with methanol to give 7-chloro-1,2-dihydro - 3-methoxy-2-methyl - 5-phenyl-3H-1,4-benzodiazepine, M.P. 173–177°. An analytical sample was obtained as pale yellow needles, M.P. 174–176°, by recrystallization from methanol.

Example 55

A solution of 4.6 g. (0.015 mole) of 6-chloro-2-chloromethyl-1,2-dihydro-4-phenylquinazoline 3-oxide in 100 ml. of tetrahydrofuran was treated with 0.68 g. (0.015 mole) of a 53.5 percent suspension of sodium hydride in mineral oil and the mixture stirred at room temperature for 0.8 hr. Traces of sodium hydride remaining were destroyed by addition of ethanol. The mixture was then filtered, concentrated to dryness and the residue crystallized from benzene/hexane to give light yellow crystals of 7-chloro-1,3 - dihydro - 5 - phenyl - 2H - azirino[1,2-a]quinazoline 4-oxide, M.P. 125–131°. An analytical sample was obtained as off-white needles of M.P. 135–136.5° by recrystallization from benzene/hexane.

Example 56

To a solution of 42.2 g. (0.137 mole) of 6-chloro-2-chloromethyl - 1,2 - dihydro - 4 - phenylquinazoline 3-oxide in 700 ml. of tetrahydrofuran cooled to —70° was added 15.4 g. (0.139 mole) of potassium t-butoxide. Cooling was discontinued and the mixture stirred at room temperature for 4.5 hr. The reaction mixture was filtered through Celite and the filtrate concentrated to dryness in vacuo. The residue was crystallized from benzene/hexane to give 7-chloro-1,3-dihydro-5-phenyl-2H-azirino[1,2-a] quinazoline 4-oxide, M.P. 122–127°.

Example 57

A solution of 3.55 g. (10 mmole) of 6-chloro-2,2-bis-(chloromethyl)-1,2-dihydro-4-phenylquinazoline 3 - oxide in 100 ml. of tetrahydrofuran was stirred overnight at room temperature with 0.53 g. (11 mmole) of a 50 percent dispersion of sodium hydride in mineral oil. The reaction mixture was filtered through Celite, diluted with water and extracted with methylene chloride in three portions. The methylene chloride extracts were combined, washed three times with water and with brine and dried over sodium sulfate. The solution was concentrated in vacuo and the residue crystallized from benzene/hexane to give 7-chloro-3-chloromethyl-1,3-dihydro-5-phenyl-2H-azirino(1,2-a)quinazoline 4-oxide as a light yellow solid, M.P. 133–137°. The analytical sample was obtained as white prisms of M.P. 136–138.5° on three recrystallizations from benzene/hexane.

Example 58

A solution of 42.4 g. (0.12 mole) of 6-chloro-2,2-bis-(chloromethyl) - 1,2 - dihydro - 4 - phenylquinazoline 3-oxide in 600 ml. of tetrahydrofuran was cooled in a Dry Ice/acetone bath. To the cooled solution was added 14.4 g. (0.13 mole) of potassium t-butoxide and the mixture was removed from the cooling bath. The mixture was stirred overnight at room temperature, filtered through Celite and concentrated in vacuo. The residue was crystallized from benzene and the off-white solid washed with ether to give 7 - chloro - 3 - chloromethyl-1,3-dihydro-5-phenyl-2H-azirino(1,2-a)quinazoline 4-oxide, M.P. 130–131°.

Example 59

A solution of 4 g. (14.8 mmole) of 7-chloro-1,3-dihydro-5-phenyl-2H-azirino(1,2-a)quinazoline 4-oxide in 200 ml. of toluene was heated under reflux for 40 min. The toluene was removed in vacuo and the residue crystallized from ether/petroleum ether to give the isomer 7-chloro-5-phenyl-5H-1,4-benzodiazepine 4-oxide, M.P. 151–158°. An analytical sample was obtained as yellow prisms, M.P. 157–158.5° by recrystallization from ethanol.

Example 60

A solution of 10 g. (31.4 mmole) of 7-chloro-3-chloromethyl - 1,3 - dihydro - 5 - phenyl - 2H - azirino(1,2 - a) quinazoline 4-oxide in 50 ml. of dimethyl sulfoxide was heated on the steam bath for 15 min. at which time the solution began to darken appreciably. After the mixture had been cooled, it was diluted with 500 ml. of water and 500 ml. of ether. The phases were separated and the aqueous phase extracted with 250 ml. of ether. The combined ethereal extracts were washed with 250 ml. of water and dried over sodium sulfate. The solution was concentrated in vacuo to leave 9.5 g. of residue which crystallized from ether to give 7-chloro-3-chloromethyl-5-phenyl-5H-1,4-benzodiazepine 4-oxide of M.P. 120–130° (dec.). The analytical sample was obtained as yellow prisms by two recrystallizations from ethyl acetate, M.P. 125–128° (dec.).

Example 61.—Preparation of 7-chloro-3-methyl-5-phenyl-5H-1,4-benzodiazepine 4-oxide from 6-chloro-2-chloromethyl - 1,2 - dihydro - 2 - methyl - 4 - phenylquinazoline 3-oxide A suspension of 96.3 g. (0.3 mole) of 6-chloro-2-chloromethyl - 1,2 - dihydro - 2 - methyl - 4 - phenylquinazoline 3-oxide in 3 liters of ether was treated with 33.6 g. (0.3 mole) of potassium t-butoxide and the mixture stirred at room temperature for 5.2 hr. The mixture was then filtered through Celite and the filtrate concentrated in vacuo in a hot water bath. Treatment of the residue with ether gave a yellow solid. This was recrystallized from ethyl acetate to give 7-chloro-3-methyl-5-phenyl-5H-1,4-benzodiazepine 4-oxide, M.P. 165–175° (dec.).

Example 62.—Reaction of 2-chloromethyl-1,2-dihydro-2-methyl-4-phenylquinazoline 3-oxide, with potassium t-butoxide to form 3-methyl-5-phenyl-5H-1,4-benzodiazepine 4-oxide A solution of 5 g. of 2-chloromethyl-1,2-dihydro-2-methyl-4-phenylquinazoline 3-oxide (17.5 mmoles) in 250 ml. of tetrahydrofuran was refluxed overnight with 1.96 g. (17.5 mmole) of potassium t-butoxide. The reaction mixture was filtered through Celite and concentrated to dryness in vacuo. The residue was crystallized from ether to give the 3-methyl-5-phenyl-5H-1,4-benzodiazepine 4-oxide product, melting at 196–200° (sinter at 170°). An analytical sample of the product, M.P. 182–184°, was obtained as off-white plates by repeated recrystallization from acetone/hexane.

Example 63.—Reaction of 2-chloromethyl-1,2-dihydro-2-methyl-6-nitro-4-phenylquinazoline 3-oxide with potassium t-butoxide to form 3-methyl-7-nitro-5-phenyl-5H-1,4-benzodiazepine 4-oxide To a solution of 3.0 g. (9 mmoles) of 2-chloromethyl-1,2 - dihydro - 2 - methyl - 6 - nitro - 4 - phenylquinazoline 3-oxide in 200 ml. of tetrahydrofuran cooled in a Dry Ice/acetone bath was added 1.0 g. (9 mmole) of potassium t-butoxide. The cooling bath was removed and the mixture stirred overnight at room temperature. The reaction mixture was filtered through Celite and concentrated to dryness in vacuo. The residue was crystallized from benzene-hexane to give 3-methyl-7-nitro-5-phenyl-5H-1,4-benzodiazepine 4-oxide as yellow solid, M.P. 190–210° (dec.). An analytical sample was obtained as yellow needles, M.P. 224–226° (dec.) by three recrystallizations from benzene-hexane.

Example 64

A cold solution of 13.0 g. (41 mmole) of 7-chloro-3-chloro - methyl - 1,3 - dihydro - 5 - phenyl - 2H - azirino (1,2-a)quinazoline 4-oxide in 600 ml. of diglyme was treated with 13.0 g. of sodium borohydride and kept in the refrigerator for 14 hr. The mixture was neutralized with glacial acetic acid, diluted with water and extracted with ether. The ethereal extracts were washed with water, dried over sodium sulfate and concentrated in vacuo to small volume. The residue was crystallized from petroleum ether to give 7-chloro-2,3,4,5-tetrahydro-3-methyl-5-phenyl-1H-1,4-benzodiazepin-4-ol as a pale yellow solid, M.P. 174–200° which was suitable for use without further purification for oxidation with mercuric oxide. Analytical sample was prepared by recrystallization from acetone/hexane and repeated crystallization from ethanol. The sample was obtained as white needles, M.P. 204–210°.

Example 65

A solution of 2.7 g. (0.010 mole of 7-chloro-1,3-dihydro-5-phenyl-2H-azirino(1,2-a)quinazoline 4-oxide in 100 ml. of diglyme was cooled to 5–10° and treated with 2.7 g. of sodium borohydride at that temperature for 1 hr. The excess sodium borohydride was destroyed with glacial acetic acid and the mixture was poured into 500 ml. of water and extracted with methylene chloride. The methylene chloride extracts were washed with water and brine and dried over sodium sulfate. The solution was concentrated to dryness, and the residue crystallized from benzene/hexane to give off-white needles of 7-chloro-2,3,4,5 - tetrahydro - 5 - phenyl - 1H - 1,4 - benzodiazepin-4-ol, M.P. 160–166°.

Example 66

A solution of 2.0 g. (7.4 mmole) of 7-chloro-5-phenyl-5H-1,4-benzodiazepine 4-oxide in 80 ml. of methanol was cooled in an ice bath and treated with 2.0 g. of sodium borohydride. After 1 hr. the reaction mixture was neutralized with acetic acid and diluted with a large volume of water. The solid 7-chloro-2,3,4,5-tetrahydro-5-phenyl-1H-1,4-benzodiazepin-4-ol, M.P. 165–167°, which separated was collected and washed with water and petroleum ether.

Example 67

A mixture of 1.0 g. (3.14 mmole) of 7-chloro-3-chloromethyl-5-phenyl-5H-1,4-benzodiazepine 4-oxide, 0.7 g. of lithium aluminum hydride and 100 ml. of tetrahydrofuran was refluxed for 1 hr. The excess lithium aluminum hydride was decomposed with 25 ml. of ethyl acetate, 50 ml. of 10 percent sodium bicarbonate solution was added and the tetrahydrofuran removed in vacuo. To the residue was added 100 ml. of methylene chloride and 50 ml. of water, the mixture was filtered and the methylene chloride layer was separated and dried over sodium sulfate. The residue left on concentration of the methylene chloride was crystallized from ether to give solid 7-chloro-2,3,4,5-tetrahydro - 3 - methyl - 5 -phenyl - 1H - 1,4 - benzodiazepin-4-ol. Two recrystallizations from ethyl acetate gave white prisms, M.P. 198–203° (dec.).

Example 68

A suspension of 4.8 g. (16.8 mmole) of 7-chloro-3-methyl-5-phenyl-5H-1,4-benzodiazepine 4-oxide in 250 ml. of methanol was treated with 2.0 g. (22.4 mmole) of tetramethyl ammonium borohydride. This mixture was stirred at room temperature. The solid gradually dissolved and later the product started to precipitate out. After the reaction mixture had stirred for three hours, it was diluted with 100 ml. of water. The precipitate was collected to give a mixture of 7-chloro-3-methyl-5-phenyl-5H - 1,4 - benzodiazepine 4-oxide and 7 - chloro - 2,3,4,5-tetrahydro - 3 - methyl - 5 - phenyl - 1H - 1,4 - benzodiazepin-4-ol, M.P. 175–195° (dec.). Pure 7-chloro-2,3,4,5 - tetrahydro - 3 - methyl - 5 - phenyl - 1H - 1,4-benzodiazepin-4-ol was obtained by recrystallization from ethyl acetate, M.P. 180–195° (dec.). A further recrystallization from ethyl acetate gave colorless prims of M.P. 185–200° (dec.).

Example 69

A solution of 5.7 g. of 7-chloro-2,3,4,5-tetrahydro-3-methyl-5-phenyl-1H-1,4-benzodiazepin-4-ol in 83 ml. of acetone containing 10 percent was stirred with 4.3 g. of mercuric oxide for 3.5 hr. The mercuric oxide was filtered off through Celite and the filter washed with methylene chloride. The filtrate was diluted with water and extracted with methylene chloride in three portions. The organic phases were combined and washed with water in two portions. The organic phase was dried over sodium sulfate and concentrated to dryness in vacuo. The residue was washed with ether. The ether solution was concentrated to dryness and the residue crystallized from ethyl acetate to give 7 - chloro - 2,3 - dihydro - 3 - methyl - 5 - phenyl-1H-1,4-benzodiazepine 4 oxide as a yellow solid, M.P. 190–195° (dec.).

Example 70

A solution of 1.0 g. (3.46 mmole) of 7-chloro-2,3,4,5-tetrahydro - 3 - methyl - 5 phenyl - 1H - 1,4 - benzodiazepin-4-ol and 55 ml. of acetone containing 10 percent water was stirred for 21 hr. with 1.0 g. (4.6 mmole) of yellow mercuric oxide. The mixture was filtered through Celite using acetone to wash the filter and the filtrate concentrated to dryness in vacuo. The residue was treated with methanol and the product 7-chloro-1,2-dihydro-3-methyl-5-phenyl-5H-benzodiazepine 4-oxide, M.P. 170–176° (dec.), was collected. An analytical sample was obtained as colorless prisms, M.P. 170–176° (dec.) by two recrystallizations from methanol.

Example 71

A solution of 1.2 g. (4.2 mmole) of 7-chloro-2,3-dihydro-3-methyl - 5 - phenyl - 1H - 1,4-benzodiazepine 4-oxide in 18 ml. of chloroform was refluxed in the presence of 2.3 ml. of phosphorus trichloride for 1 hr. The reaction mixture was poured into a mixture of methylene chloride, excess 50 percent potassium hydroxide solution and ice. The mixture was stirred vigorously and the organic layer separated. The aqueous phase was re-extracted twice with methylene chloride. The organic layer was combined, washed with water four times, dried over sodium sulfate and filtered. The solution was then filtered through alumina and concentrated to dryness. The residue was crystallized from ether/petroleum ether to give yellow crystals of 7-chloro - 2,3 - dihydro-3-methyl-5-phenyl-1H-1,4-benzodiazepine, M.P. 122–126° (dec.).

Example 72

7-chloro - 1,2 - dihydro - 5 - phenyl-3H-1,4-benzodiazepine 4-oxide (0.5 g.) was dissolved in chloroform (100 ml.) and stirred overnight at room temperature with precipitated manganese dioxide (15 g.). The manganese dioxide was filtered off and washed with methylene chloride. The solvents were removed in vacuo to leave a black tar which on standing with ether/methanol deposited a crystalline material. This material was dissolved in methylene chloride, the solvent displaced with ethanol (ca. 1 ml.) and was allowed to stand for 24 hrs. The solid 7-chloro - 1,3 - dihydro-5-phenyl-2H-1,4-benzodiazepin-2-one 4-oxide was filtered off; M.P. 234–235°.

Example 73

A solution of 1 g. (3.5 mmoles) of 7-chloro-1,2-dihydro-3-methyl-5-phenyl - 5H-1,4-benzodiazepine 4-oxide in 200 ml. of chloroform was stirred with 10 g. of active manganese dioxide for 1.5 hr. The manganese dioxide was filtered off and the filtrate concentrated in vacuo to leave a tar which was crystallized from ether to give a tan solid, M.P. 150–163° (dec.). This was recrystallized from ethyl acetate to give 7-chloro-3-methyl-5-phenyl-5H-1,4-benzodiazepine 4-oxide, M.P. 169–174° (dec.).

Example 74

To a suspension of 3.2 g. (10 mmole) of 6-chloro-2-chloromethyl-1,2 - dihydro-2-methyl-4-phenylquinazoline 3-oxide in 250 ml. of ether was added 3.0 g. (27 mmole) of potassium t-butoxide. The mixture was stirred for 0.5 hr. To the mixture was added 100 ml. of 10 percent sodium bicarbonate solution, 100 ml. of water and 100 ml. of methylene chloride. After the mixture had been equilibrated, an orange solid was filtered off and the organic phase separated. The organic phase was dried over sodium sulfate and concentrated in vacuo. The residue was combined with the above orange solid and recrystallized from ethanol to give the product, 7-chloro-1,2-dihydro - 3 - methylene-5-phenyl-3H-1,4-benzodiazepine 4-oxide, M.P. 153–162° (dec.). Recrystallization from ethyl acetate gave orange needles, M.P. 157–163° (dec.).

Example 75

A solution of 2.0 g. (6.23 mmole) of 7-chloro-1,2-dihydro-3-methylene - 5 - phenyl-3H-1,4-benzodiazepine 4-oxide in 75 ml. of ethanol was reduced with hydrogen at room temperature and atmospheric pressure using 3 g. of wet Raney nickel as catalyst. The volume of hydrogen consumed was 367 ml. (ca. 15 mmoles). The reaction mixture was neutralized with ammonia, the catalyst was filtered off and the filtrate concentrated in vacuo to leave a yellow tar. This was dissolved in 100 ml. of methylene chloride and the solution was washed with 100 ml. of 10 percent sodium bicarbonate solution and dried over sodium sulfate. The residue left on evaporation of the solvent was dissolved in ether and filtered through 50 g. of alumina. The first 200 ml. were collected, concentrated in vacuo and the residue crystallized from hexane to give 7-chloro - 2,3 - dihydro-3-methyl-5-phenyl-1H-1,4-benzodiazepine, M.P. 110–117°.

Example 76

A solution of 15.25 g. (50 mmoles) of 6-chloro-2-chloromethyl - 1,2 - dihydro-2-methyl-4-phenylquinazoline in 300 ml. of dry tetrahydrofuran was stirred for 3 hrs. with 5.5 g. (50 mmoles) of potassium t-butoxide. The brown mixture was then filtered through Celite and concentrated in vacuo to leave an orange oil. From this was obtained 7-chloro - 1,2 - dihydro-3-methylene-5-phenyl-3H-1,4-benzodiazepine, M.P. 105–114° (dec.). A sample was recrystallized three times from aqueous methanol to give yellow needles, M.P. 108–114° (dec.).

Example 77

A solution of 4.5 g. (17.2 mmoles) of 7-chloro-1,2-dihydro - 3 - methylene-5-phenyl-3H-1,4-benzodiazepine in 80 ml. of ethanol was reduced with hydrogen at room temperature and atmospheric pressure using 9 g. of wet Raney nickel as catalyst. The volume of hydrogen consumed was 477 ml. (ca. 20 mmole). The catalyst was filtered off and the filtrate concentrated in vacuo to 4.9 g. of red oil which was dissolved in 100 ml. of methylene chloride and washed with 100 ml. of 10 percent sodium carbonate solution. The organic phase was dried over sodium sulfate and concentrated in vacuo. The residue was dissolved in ether and the solution filtered through 50 g. of alumina. The first 150 ml. were concentrated in vacuo and the residue crystallized from ether/hexane. Filtration of an ether solution of this material through 50 g. of alumina and crystallization from hexane of the residue gave the pure product, 7-chloro-2-,3-dihydro-3-methyl-5-phenyl-1H-1,4-benzodiazepine M.P. 121–124°.

Example 78

A solution of 5 g. (18.3 mmole) of 6-chloro-1,2-dihydro-2-methyl-4-phenylquinazoline 3-oxide in 150 ml. of dry tetrahydrofuran cooled in an ice bath was stirred for 5 min. with 1.24 g. (27.4 mmole) of a 53 percent dispersion of sodium hydride in oil. To this mixture was added 2.6 ml. (40 mmole) of methyl iodide in two portions and the mixture stirred until the color became yellow. The reaction mixture was filtered and the filtrate concentrated in vacuo. The residue was triturated with chloroform and the chloroform solution filtered and concentrated in vacuo to leave the 6-chloro-1,2-dihydro-1,2-dimethyl-4-phenylquinazoline 3-oxide product which was purified by recrystallization from aqueous ethanol to give yellow plates, M.P. 154–156°.

Example 79

A solution of 100.8 g. (0.4 mole) of 1,2-dihydro-2,2-dimethyl-4-phenylquinazoline 3-oxide in 3 l. of dry tetrahydrofuran cooled in an ice bath was stirred for 5 min. with 22.4 g. (0.2 mole) of potassium t-butoxide. To this mixture was added 12.5 ml. (0.2 mole) of methyl iodide and the reaction mixture stirred for 15 min. The addition of potassium t-butoxide and methyl iodide was repeated twice and then the mixture allowed to stir for 1 hr. in ice bath. The insoluble material was removed by filtration through Celite and the filtrate concentrated in vacuo. The residue was crystallized from hexane and the product collected and washed with 1:1 hexane/ether to give 1,2-dihydro-1,2,2-trimethyl-4-phenyl-quinazoline 3-oxide, M.P. 98–103°. Purification by recrystallization from cyclohexane gave yellow prisms, M.P. 110–112°.

Example 80

A mixture of 50.5 g. (0.17 mole) of 1,2-dihydro-2,2-dimethyl-6-nitro-4-phenylquinazoline 3-oxide, 2 l. of dry tetrahydrofuran and 20.2 g. (0.18 mole) of potassium t-butoxide was stirred at room temperature for 3 min. and 42.3 ml. (0.68 mole) of methyl iodide was added. The mixture was refluxed for 1 hr., filtered through Celite and concentrated in vacuo to a small volume. The product was collected to give 1,2-dihydro - 1,2,2 - trimethyl-6-nitro-4-phenylquinazoline 3-oxide having a melting point of 186–188°. Purification by recrystallization from chloroform/hexane gave yellow needles, M.P. 188–189°.

Example 81

A solution of 28.8 g. (95 mmole) of 6-chloro-1,2-dihydro-1,2,2-trimethyl-4-phenylquinazoline 3-oxide in 500 ml. of ethanol was hydrogenated at room temperature and atmospheric pressure using 50 g. of Raney nickel slurry as catalyst. During 20 min., 2.4 l. of hydrogen was consumed. The mixture was neutralized with concentrated ammonium hydroxide, the catalyst was filtered off and, after benzene had been added, the filtrate concentrated in vacuo to a red oil. The red oil was dissolved in 250 ml. of ether and washed with 250 ml. of 5 percent sodium bicarbonate solution. Removal of the solvent after the ethereal solution had been dried over sodium sulfate left a yellow oil which was crystallized from ether/hexane and purified by filtration through 40 g. of alumina with 100 ml. of methylene chloride to give 6-chloro-1,2-dihydro-1,2,2-trimethyl-4-phenylquinazoline, M.P. 80–89°. Recrystallization from hexane gave yellow prisms, M.P. 86.5–88.5°.

Example 82

A solution of 1.4 g. (5.0 mmole) of 6-chloro-1,2-dihydro-1,2,2-trimethyl-4-phenylquinazoline in 5 ml. of ether was treated with 2 ml. of 3.75 N methanolic hydrogen chloride and the mixture diluted with 30 ml. of ether to give 6-chloro - 1,2 - dihydro-1,2,2-trimethyl-4-phenylquinazoline hydrochloride, M.P. 170–175° (sinter 110°) which was purified by recrystallization from methanol/ether to give orange needles, M.P. 170–172°.

Example 83

A suspension of 3.5 g. (10.2 mmole) of 6-chloro-2-dichloromethyl-1,2-dihydro-4-phenylquinazoline 3-oxide in 100 ml. of ethanol was hydrogenated at room temperature and atmospheric pressure using 10 g. of Raney nickel slurry as catalyst. During 0.5 hr., 285 ml. of hydrogen were consumed. The catalyst was filtered off, the filtrate neutralized with concentrated ammonium hydroxide and concentrated in vacuo. The residue was crystallized from benzene/hexane to give 6-chloro-2-dichloromethyl-1,2-dihydro-4-phenylquinazoline, M.P. 135–150° (dec.). Purification by recrystallization from cyclohexane gave yellow needles, M.P. 152–154°.

Example 84

A suspension of 36.45 g. (0.106 mole) of 6'-chloro-1-methyl-4'-phenylspiro[piperidine - 4,2'(1'H)quinazoline] 3'-oxide in 300 ml. of ethanol was hydrogenated at room temperature and atmospheric pressure using 31 g. of Raney nickel slurry as catalyst.

During 17 hr. 2.8 l. of hydrogen was consumed. The catalyst was filtered off and and filtrate concentrated in vacuo to a yellow tar. This was treated with hexane/ether and the undissolved material filtered off. The residue left on removal of the solvent from the filtrate in vacuo was crystallized from hexane to give the product 6'-chloro-1-methyl-4'-phenylspiro[piperidine - 4,2'(1'H)-quinazoline] having a melting point of 120–127°. Purification by filtration of an ether solution through alumina and recrystallization from methylene chloride/hexane gave yellow prisms, M.P. 127–129°.

Example 85

A solution of 3.27 g. (10 mmole) of 6'-chloro-1-methyl-4'-phenylspiro[piperidine-4',2(1'H)quinazoline] in 50 ml. of ether was treated with excess methanolic hydrogen chloride. The precipitated dihydrochloride was collected and purified by recrystallization from ethanol/ether to give orange prisms of 6'-chloro-1-methyl-4'-phenylspiro-[piperidine-4,2'(1'H)-quinazoline]dihydrochloride, M.P. 198–205° (solidify/remelt 300–305°).

Example 86

A solution of 12.64 g. (39.4 mmole) of 6-chloro-2-chloromethyl-1,2-dihydro-2-methyl - 4 - phenylquinazoline 3-oxide in 250 ml. of warm ethanol was hydrogenated at room temperature and atmospheric pressure using 44 g. give orange prisms of 6'-chloro-1-methyl-4'-phenylspjiro-of Raney nickel slurry as catalyst. During 5 hr., 916 ml. of hydrogen were consumed. The catalyst was filtered off and the filtrate concentrated in vacuo to leave a red oil which was crystallized from hexane/ether to give 6-chloro-2-chloromethyl - 1,2 - dihydro - 2 - methyl-4-phenylquinazoline, M.P. 110–120° (dec.). Purification by recrystallization from hexane gave yellow prisms, M.P. 115–121° (dec.).

Example 87

To a refluxing solution of 28.7 g. (0.1 mole) of 2-chloromethyl - 1,2 - dihydro - 2 - methyl - 4 - phenylquinazoline 3-oxide in 1 l. of ethanol was added 100 ml. of 1 N sodium hydroxide during 5 min. The mixture was refluxed 5 min. more and cooled immediately in an ice bath. The mixture was then neutralized with acetic acid, filtered, concentrated in vacuo to approximately 100 ml. and allowed to stand overnight in the refrigerator. A small amount of sodium chloride was filtered off and the filtrate concentrated in vacuo to a thick oil which was dissolved in 500 ml. of methylene chloride and washed with 500 ml. of water. The organic phase was separated, dried over sodium sulfate and concentrated in vacuo. The residue was crystallized from ether to give 2-methyl-5-phenyl-3H-1,4-benzodiazepine 4-oxide, M.P. 126–137°. The analytical sample was obtained as colorless prisms, M.P. 127–138° (dec.) by three recrystallizations from ethyl acetate.

Example 88

A solution of 5.0 g. (20 mmole) of 2-methyl-5-phenyl-3H-1,4-benzodiazepine 4-oxide in 60 ml. of methanol was cooled in an ice bath and stirred with 2.0 g. of sodium borohydride for 0.5 hr. The mixture was then diluted with 200 ml. of water and extracted with 200 ml. of ether and then 200 ml. of methylene chloride in two portions. The organic extracts were combined, washed with 200 ml. of water in two portions and dried over sodium sulfate. Removal of the solvent in vacuo left a yellow oil which crystallized from ether to give 2,3-dihydro-2-methyl-5-phenyl - 1H - 1,4-benzodiazepine 4-oxide, M.P. 100–150°. Colorless prisms of M.P. 148–151° (sinter at 60–90°) were obtained on crystallization from aqueous methanol and then benzene.

Example 89

A solution of 4.1 g. (16.4 mmole) of 2-methyl-5-phenyl-3H-1,4-benzodiazepine 4-oxide in 75 ml. of ethanol was hydrogenated at room temperature and atmospheric pressure using 7 g. of wet Raney nickel as catalyst. After approximately 2 equivalents of hydrogen had been consumed, the catalyst was filtered off and the filtrate concentrated in vacuo. The residue was crystallized from ether and then from cyclohexane to give 2-methyl-5-phenyl-3H-1,4-benzodiazepine, M.P. 105–110° which was raised to 108–110° on crystallization from acetone/hexane and from cyclohexane.

Example 90

A solution of 4.0 g. (15.8 mmole) of 2,3-dihydro-2-methyl-5-phenyl-1H-1,4-benzodiazepine 4-oxide in approximately 75 ml. of ethanol was hydrogenated at room temperature and atmospheric pressure using 10 g. of wet Raney nickel as catalyst. The hydrogenation was stopped after consumption of 406 ml. (ca. 18.5 mmole) of hydrogen. The catalyst was filtered off and the filtrate concentrated in vacuo after benzene had been added. The residue was dissolved in ether and filtered through 50 g. of alumina. The first 100 ml. of filtrate were concentrated in vacuo. The residue was crystallized from ether/hexane to give 2,3 - dihydro - 2 - methyl-5-phenyl-1H-1,4-benzodiazepine, M.P. 107–110°.

Example 91

A solution of 1.5 g. (6.35 mmole) of the free base 2,3-dihydro-2-methyl-5-phenyl-1H-1,4-benzodiazepine in 5 ml. of methanol was treated with 1 ml. of 7.7 N methanolic hydrogen chloride and diluted with 50 ml. of ether. The product was filtered off and washed with petroleum ether to give 2,3-dihydro-2-methyl-5-phenyl-1H - 1,4 - benzodiazepine hydrochloride, M.P. 246–249°. The analytical sample was obtained as yellow needles having a melting point of 249–252° on recrystallization from methanol/ether.

Example 92

To a solution of 3.3 g. (10 mmole) of 2-chloromethyl-1,2-dihydro-2-methyl-6-nitro-4-phenylquinazoline 3-oxide in 150 ml. of ethanol was added 10 ml. of 1 N sodium hydroxide and this mixture refluxed for 15 min. The residue left on removal of solvent in vacuo was dissolved in 250 ml. of methylene chloride and washed with 250 ml. of water. The methylene chloride solution was concentrated and dried over sodium sulfate. The residue was dissolved in 30 ml. of methylene chloride and filtered through 50 g. of alumina. The alumina was washed with 200 ml. of methylene chloride and 200 ml. of ethyl acetate. Removal of the solvents in vacuo and crystallization of the residue from ether gave the product 2-methyl-7-nitro-5-phenyl-3H-1,4-benzodiazepine 4-oxide. An analytical sample was obtained as pale yellow needles. M.P. 196–200° (dec.) on recrystallization from ethyl acetate.

Example 93

A solution of 1.0 g. (3.4 mmole) of 3-methyl-7-nitro-5-phenyl-5H-1,4-benzodiazepine 4-oxide and 0.5 g. tetramethylammonium borohydride in 100 ml. of methanol was refluxed for 0.5 hr. Filtration of the reaction mixture which had been cooled in an ice bath gave the product 2,3,4,5 - tetrahydro - 4 - hydroxy - 3 - methyl - 7 - nitro - 5-phenyl-1H-1,4-benzodiazepine. An analytical sample was obtained as yellow plates on recrystallization from tetrahydrofuran/water, M.P. 222–228° (dec.).

Example 94

A solution of 10.5 g. (36.4 mmole) of 7-chloro-2,3,4,5-tetrahydro - 4 - hydroxy - 3 - methyl - 5 - phenyl - 1H-1,4-benzodiazepine in 500 ml. of acetone containing 10 percent water was stirred for 5 hrs. at room temperature with 11.3 g. (52 mmole) of yellow mercuric oxide. The mixture was filtered and the filtrate concentrated in vacuo. The residue was crystallized from methanol to give the double bond isomer 7 - chloro - 1,2 - dihydro-3-methyl-5-phenyl-5H-1,4-benzodiazepine 4-oxide. From the mother liquors there was obtained on concentration in vacuo 7 - chloro - 2,3 - dihydro - 3 - methyl - 5 - phenyl - 1H-1,4-benzodiazepine 4-oxide, M.P. 170–204° (dec.). Recrystallization from ethyl acetate gave yellow prisms, M.P. 200–203°.

Example 95

To a filtered solution of 10 g. of polymeric dichloroacetaldehyde in 50 ml. of ethanol was added 3.7 g. (15.6 mmole) of 2-amino-5-nitrobenzophenone β-oxime. The mixture was heated to boiling and then allowed to cool to room temperature. The precipitate was collected to give 2 - dichloromethyl - 1,2-dihydro-6-nitro-4-phenylquinazoline 3-oxide as a yellow product, M.P. 215–230° (dec.).

Example 96

The solvent was distilled from a mixture of 75 ml. (0.66 mole) of distilled dichloroacetaldehyde, 100 g. (0.337 mole) of 1,2 - dihydro - 2,2 - dimethyl - 6-nitro-4-phenylquinazoline 3-oxide, 0.8 ml. of concentrated hydrochloric acid and 1 l. of ethanol. During 25 min., 360 ml. of distillate was collected. The residue was cooled on ice and the yellow solid product collected to give 2-dichloromethyl - 1,2 - dihydro-6-nitro-4-phenylquinazoline 3-oxide, M.P. 239–241° (darken 220–230°).

Example 97

A mixture of 40 g. (0.114 mole) of 2-dichloromethyl-1,2-dihydro-6-nitro-4-phenylquinazoline 3-oxide, 112 ml. of 3 N aqueous sodium hydroxide and 1.2 l. of ethanol were stirred overnight at room temperature. This mixture was diluted with 1.2 l. of water and acidified with 38 ml. of 3 N hydrochloric acid. The precipitate was collected and dried. This material was heated under reflux for 4 hrs. with 250 ml. of ethanol. The mixture was cooled and the product 1,2 - dihydro - 7-nitro-5-phenyl-2H-1,4-benzodiazepin-2-one 4-oxide, M.P. 208–218° (dec.) collected.

Example 98

A mixture of 167.9 g. (0.742 mole) of 2-amino-5-methyl-benzophenone oximes, 5 g. of cupric sulfate, 1 ml. of acetic acid and 3 l. of acetone was refluxed for 2 hrs. After the mixture had been cooled in an ice bath, the product was collected and washed with water. Additional product was obtained on concentrating the mother liquors. Purification by recrystallization from chloroform/hexane gave yellow needles of 1,2 - dihydro - 2,2,6 - trimethyl-4-phenylquinazoline 3-oxide, M.P. 205–212° (dec.).

Example 99

A mixture of 25 g. (94 mmole) of 1,2-dihydro-2,2,6-trimethyl-4-phenylquinazoline 3-oxide, 25 ml. of technical chloroacetone, 0.25 ml. of concentrated hydrochloric acid, 50 ml. of benzene and 500 ml. of ethanol were heated for 1 hr. while approximately 200 ml. of solvent was distilled off. The residue was cooled in an ice bath and the product was collected. Additional product was obtained in concentration of the mother liquors. Purification by recrystallization from methylene chloride/hexane gave yellow prisms of 2 - chloromethyl - 1,2 - dihydro-2,6-dimethyl-4-phenyl-quinazoline 3-oxide, M.P. 172–174°.

Example 100

To a suspension of 32.1 g. (0.112 mole) of 2-chloromethyl-1,2-dihydro-2-methyl-4-phenylquinazoline 3-oxide in 1 l. of anhydrous ether was added 20 g. (0.178 mole) of potassium t-butoxide and the mixture stirred for 0.5 hr. at room temperature. Then 750 ml. of 10 percent sodium bicarbonate solution was added and the ether layer separated. The aqueous layer was extracted with 200 ml. of methylene chloride and the combined organic layers were dried over sodium sulfate. The solvents were removed in vacuo and the residue filtered through alumina using methylene chloride as eluent. Purification by recrystallization from ethyl acetate/hexane gave the product 1,2-dihydro - 3 - methylene - 5-phenyl-3H-1,4-benzodiazepine 4-oxide as orange needles, M.P. 136–140°.

What is claimed is:
1. A method of preparing a compound of the formula

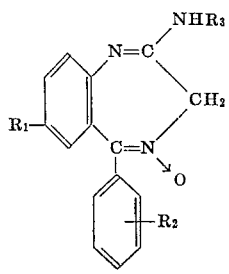

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_3$ is selected from the group consisting of hydrogen and lower alkyl and lower alkenyl
which comprises treating a compound of the formula

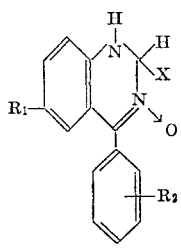

wherein $R_1$ and $R_2$ have the same significance as above and X is an $\alpha,\alpha$-dihalo methyl group
with a member selected from the group consisting of ammonia and lower alkylamine and lower alkenylamine.

2. A method of preparing a compound of the formula

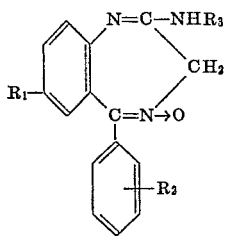

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_3$ is selected from the group consisting of hydrogen, lower alkyl and lower alkenyl
which comprises treating a compound of the formula

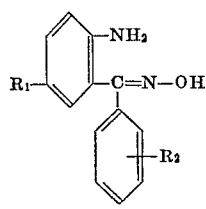

wherein $R_1$ and $R_2$ have the same significance as above with dihaloacetaldehyde in the presence of a heavy metal salt, isolating the product of the reaction and treating it with a member selected from the group consisting of ammonia, lower alkylamine and lower alkenylamine.

3. A method of preparing a compound of the formula

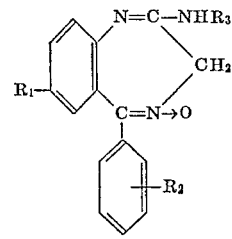

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_3$ is selected from the group consisting of hydrogen, lower alkyl and lower alkenyl
which comprises treating a β-oxime of the formula

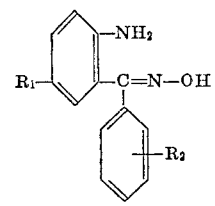

wherein $R_1$ and $R_2$ have the same significance as above with dihaloacetaldehyde in the presence of a mineral acid and treating the reaction mixture with a member selected from the group consisting of ammonia, lower alkylamine and lower alkenylamine.

4. A method of preparing compounds of the formula

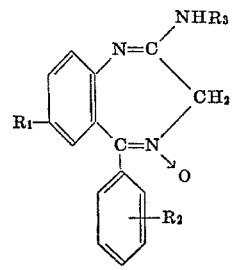

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_3$ is selected from the group consisting of hydrogen, lower alkyl and lower alkenyl
which comprises treating a compound of the formula

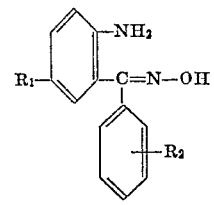

wherein $R_1$ and $R_2$ have the same significance as above with acetone in the presence of a heavy metal salt, heating the reaction product with dichloroacetaldehyde, distilling acetone from the reaction mixture and thereafter treating the reaction mixture with a member selected from the group consisting of ammonia, lower alkylamine and lower alkenylamine.

5. The method of preparing 7-chloro-2-methylamino-5-phenyl-3H-1,4-benzodiazepine 4-oxide which comprises treating 6-chloro-2-dichloromethyl-1,2-dihydro-4-phenylquinazoline 3-oxide with methylamine.

6. A method which comprises treating 2-amino-5-chlorobenzophenone β-oxime with dichloroacetaldehyde thereby producing 6-chloro-2-dichloromethyl-1,2-dihydro-4-phenylquinazoline 3-oxide and treating the latter compound with methylamine thereby producing 7-chloro-2-methylamino-5-phenyl-3H-1,4-benzodiazepine 4-oxide.

7. A method which comprises treating a member selected from the group consisting of 2-amino-5-chlorobenzophenone α-oxime, 2-amino-5-chlorobenzophenone β-oxime and mixtures of α- and β-oximes of 2-amino-5-chlorobenzophenone with acetone in the presence of cupric sulfate thereby producing 6-chloro-2,2-dimethyl-1,2-dihydro-4-phenylquinazoline 3-oxide, heating the latter compound in the presence of dichloroacetaldehyde and distilling off acetone thereby producing 6-chloro-2-dichloromethyl - 1,2 - dihydro-4-phenylquinazoline 3-oxide and treating the latter compound with methylamine thereby producing 7 - chloro-2-methylamino-5-phenyl-3H-1,4-benzodiazepine 4-oxide.

References Cited

UNITED STATES PATENTS 2,893,992   7/1959   Sternbach _____ 260—239

ALTON D. ROLLINS, *Primary Examiner.*